United States Patent [19]
Miller et al.

[11] Patent Number: 5,809,528
[45] Date of Patent: Sep. 15, 1998

[54] METHOD AND CIRCUIT FOR A LEAST RECENTLY USED REPLACEMENT MECHANISM AND INVALIDATED ADDRESS HANDLING IN A FULLY ASSOCIATIVE MANY-WAY CACHE MEMORY

[75] Inventors: Christopher Paul Miller, Underhill; Dale Edward Pontius, Colchester, both of Vt.

[73] Assignee: International Business Machines Corporation, Armonk, N.Y.

[21] Appl. No.: 772,819

[22] Filed: Dec. 24, 1996

[51] Int. Cl.$^6$ .............................. G06F 12/00; G06F 13/00
[52] U.S. Cl. .............................. 711/136; 711/3; 711/118; 711/128; 711/154
[58] Field of Search ............................... 711/3, 118, 128, 711/130, 134, 136, 154, 210

[56] References Cited

U.S. PATENT DOCUMENTS

| | | |
|---|---|---|
| 4,361,878 | 11/1982 | Lane et al. . |
| 4,422,145 | 12/1983 | Sacco et al. . |
| 4,463,424 | 7/1984 | Mattson et al. .......................... 711/136 |
| 4,783,735 | 11/1988 | Miu et al. ................................ 711/136 |
| 4,843,542 | 6/1989 | Dashiell et al. . |
| 5,014,195 | 5/1991 | Farrell et al. ............................ 711/128 |
| 5,031,141 | 7/1991 | Guddat et al. . |
| 5,055,999 | 10/1991 | Frank et al. . |
| 5,163,140 | 11/1992 | Stiles et al. . |
| 5,261,066 | 11/1993 | Jouppi et al. . |
| 5,297,265 | 3/1994 | Frank et al. . |
| 5,317,718 | 5/1994 | Jouppi . |
| 5,325,511 | 6/1994 | Collins et al. . |
| 5,327,547 | 7/1994 | Stiles et al. . |
| 5,339,399 | 8/1994 | Lee et al. . |
| 5,353,424 | 10/1994 | Partovi et al. ........................... 711/128 |
| 5,355,467 | 10/1994 | MacWilliams et al. . |
| 5,369,753 | 11/1994 | Tipley . |
| 5,386,528 | 1/1995 | Ando et al. . |
| 5,404,486 | 4/1995 | Frank et al. ............................. 711/128 |
| 5,446,863 | 8/1995 | Stevens et al. . |
| 5,515,518 | 5/1996 | Stiles et al. . |
| 5,517,633 | 5/1996 | Ohta et al. . |
| 5,522,056 | 5/1996 | Watanabe et al. ....................... 711/128 |
| 5,526,512 | 6/1996 | Arimilli et al. . |
| 5,590,308 | 12/1996 | Shih ......................................... 711/136 |
| 5,615,353 | 3/1997 | Lautzenheiser ......................... 711/136 |

OTHER PUBLICATIONS

"Pass–Device Magnitude Comparator Cell," *IBM Technical Disclosure Bulletin*, vol. 34, No. 4A, Sep., 1991.

"Computer Storage Systems and Technology," Matick, Richard E., John Wiley & Sons, Inc., Copyright 1977, pp. 591–597.

SP 23.2: A 1MB, 100MHz Integrated L2 Cache Memory with 128b Interface and ECC Protection, 1996 IEEE International Solid–State Circuits Conference, Feb. 10, 1996.

*Primary Examiner*—Tod R. Swann
*Assistant Examiner*—Tuan V. Thai
*Attorney, Agent, or Firm*—Calfee, Halter & Griswold LLP

[57] ABSTRACT

An architecture and method of implementing an invalid data handling least recently used replacement mechanism in a cache memory system is provided that includes a first register stack, a second register stack and stack control logic. The first register stack includes registers for holding entry address information. The stack control logic includes logic for inhibiting the placement of invalidated entry addresses into a Most Recently Used register in the first register stack and directs that such invalidated entry addresses be input into the second register. The stack control logic further directs that any new entry addresses be placed in the first register stack where invalidated entry addresses has resided. A counter keeps count of the number of invalidated entry addresses input into the second register stack and toggles a multiplexer at a Least Recently Used Entry output of the first register stack to select as its output, the output of the second register stack. In this manner, invalidated entry address are output from the cache through the second register stack while valid Least Recently Used entry addresses remain in the first register stack.

29 Claims, 18 Drawing Sheets

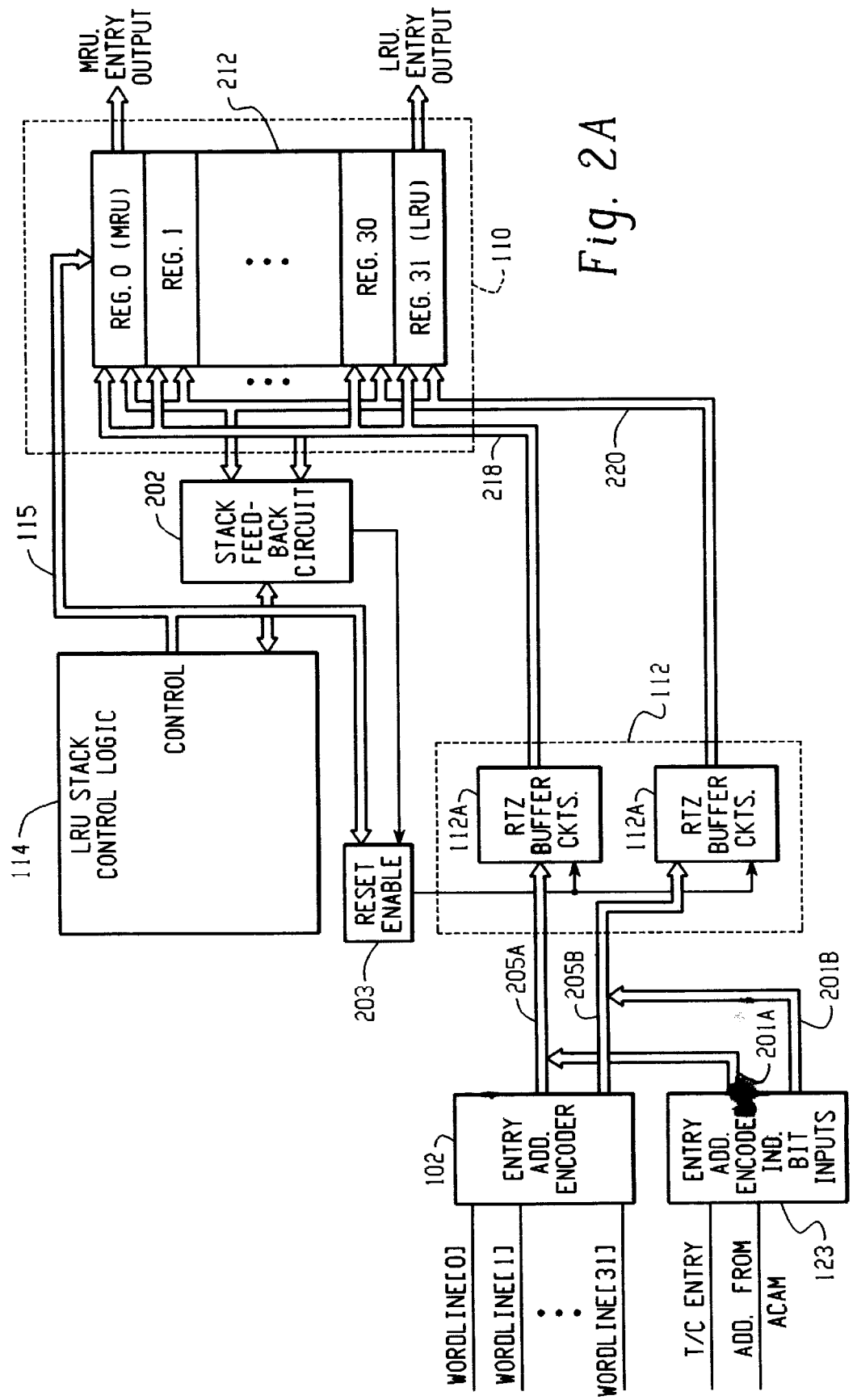

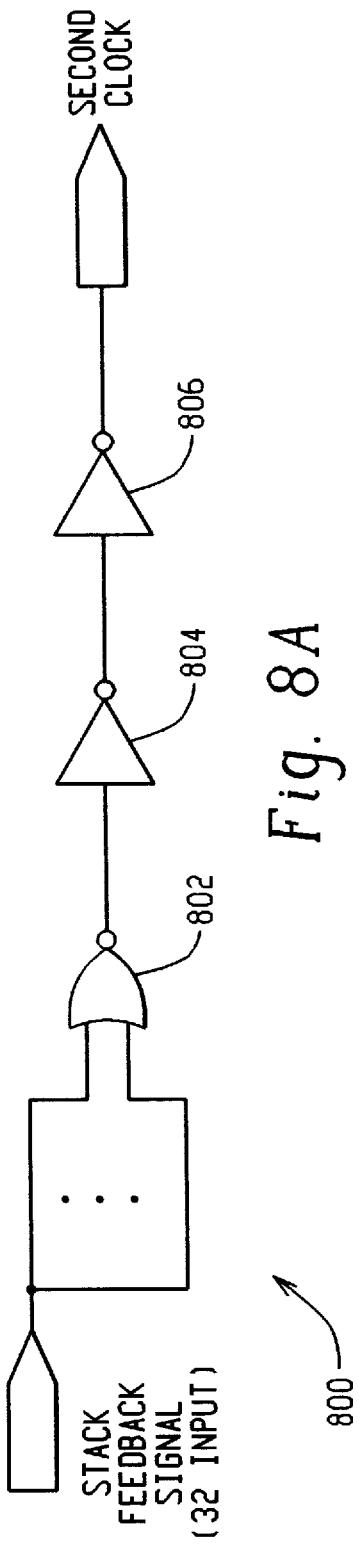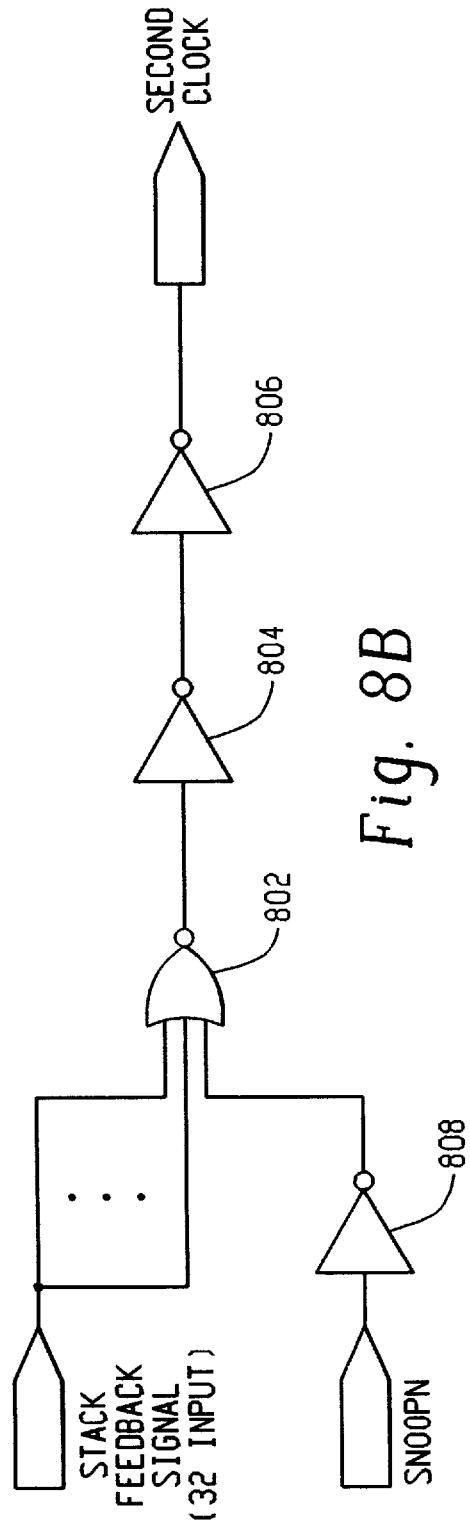

METHOD AND CIRCUIT FOR A LEAST RECENTLY USED REPLACEMENT MECHANISM AND INVALIDATED ADDRESS HANDLING IN A FULLY ASSOCIATIVE MANY-WAY CACHE MEMORY

FIELD OF THE INVENTION

The invention relates generally to cache memory devices, and more particularly, to cache memory devices having least recently used replacement mechanisms. The invention further relates to a method of handling invalid data in a cache memory system.

BACKGROUND OF THE INVENTION

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a central processing unit (CPU), or microprocessor, and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT (IBM PC/AT), IBM's APTIVA, PERSONAL SYSTEM/1 (IBM PS/1), and PERSONAL SYSTEM/2 (IBM PS/2).

At the heart of such systems is the microprocessor or central processing unit (CPU) (referred to collectively as the "processor.") The processor performs most of the actions responsible for application programs to function. The execution capabilities of the system are closely tied to the CPU: the faster the CPU can execute program instructions, the faster the system as a whole will execute.

Early processors executed instructions from relatively slow system memory, taking several clock cycles to execute a single instruction. They would read an instruction from memory, decode the instruction, perform the required activity, and write the result back to memory, all of which would take one or more clock cycles to accomplish.

As applications demanded more power from processors, internal and external cache memories were added to processors. A cache memory (hereinafter cache) is a section of very fast memory located within the processor or located external to the processor and closely coupled to the processor. Blocks of instructions or data are copied from the relatively slower system memory (DRAM) to the faster cache memory where they can be quickly accessed by the processor.

Cache memories are classified into two general groups: direct mapping caches and associative caches. In a direct mapping cache, the cache includes data that directly corresponds to data address locations in the system memory. A disadvantage of direct mapping is that, being smaller than system memory, cache data corresponds to a section or sections of main memory and is often displaced by new data corresponding to different sections of main memory. Therefore a direct mapped cache must often be larger than an associative cache in order to hold sections of main memory as effectively as an associative memory. An unfortunate result of making a direct mapped cache larger is to cause a degradation in cache performance. Direct mapped caches are often avoided for these reasons.

An associative cache differs from a direct mapping cache in that an associative cache dynamically assigns data in its register. That is, the data in an associative cache does not have the same physical address as in main memory. Instead, the associative cache typically assigns the data a cache address determined by the location where the data is stored in the cache memory. Therefore, an associative cache is generally slower than a direct mapping cache because a search of cache memory is required before the cache can report that the information requested is not present (i.e. known as a "miss").

However, n-way set-associative caches have been developed that incorporate the direct mapping and associative cache techniques. In an n-way set-associative cache, the cache memory is broken into "n" blocks, each corresponding to absolute addresses located in the system memory. Within each of the "n" blocks, data may be dynamically assigned based on the memory location within the block. In this manner, an n-way set-associative cache exhibits the quickness of a direct mapping cache and the flexibility of dynamic address assigning of an associative cache. The term "entry" is synonymous with the term "way" and will hereinafter be used interchangeably.

Another important characteristic which affects cache performance is the manner in which data is replaced or discarded from a cache when making room for new data. Data can be selected to be replaced on the basis of first in, first out (FIFO), least recently used (LRU), least frequently used (FU), and so on. While no single optimum replacement scheme exists, various studies have shown that certain schemes are best suited for particular classes of problems and worse for other classes. As a result, many disk/main memory systems use a not recently used scheme which is an approximation to a true LRU scheme. Using such a scheme it is expected that a "hit" will be more likely to occur subsequent read operations because data that has been referenced recently remains present in the cache while data that has not been referenced after many cache read operations tends not to remain. For smaller degrees of associativity (2, 4, or 8 way), a non-associative function can provide LRU replacement adequately. But for caches with high degrees of associativity (32 way, 64 way, and larger) these schemes require large logic fan-in and storage of large numbers of bit-pairs. For large degrees of associativity, a true LRU replacement can be achieved by utilizing associative ordering of addresses. See Matick, Richard E., *Computer Storage Systems and Technology* (John Wily & Sons 1977) pp. 591–597. Such a LRU replacement scheme can be faster and more efficient when used in a many-way cache memory.

In such a scheme, a LRU replacement mechanism stores information in a register stack from top to bottom, or vice-versa. The top register typically contains the Most Recently Used (hereinafter MRU) information and the bottom register typically contains the LRU information, or vice-versa. The register stack is generally a push-down, or push-up, stack where information at the top or bottom of the stack makes its way down or up the registers based whether there is a "hit" in the cache. A "hit" indicates that the cache memory includes the requested information. When a "hit" occurs in the cache, the way or entry address containing the requested information is placed in the MRU register while all more recently used way or entry addresses are pushed-down or pushed-up toward the LRU end of the stack In this manner, the way or entry addresses are re-ordered and the location of any way address in the register stack indicates its relative recentness with respect to the other way or entry addresses. See Matick, Richard E., *Computer Storage Systems and Technology* (John Wily & Sons 1977) pp. 591–597 for further details on LRU replacement mechanisms. Thus, by maintaining way or entry usage information, a true least recently used way address will be selected when replacing data in the cache.

Cache memories which employ associative ordering for LRU and MRU calculation must also be capable of dealing with addresses of invalid data. Cache memory information becomes invalid, stale or old when it has been modified in some areas of memory and not in others. For example, in a multi-processor system, information originally stored in main memory may be modified by another processor and, in that case, the information stored in a another cache memory would no longer be current. Because it is no longer current, the data is referred to as old, stale or invalid. To detect such situations, many memory systems initiate what is called a "snoop" cycle. A "snoop" cycle searches the system memories, like the cache memory, for the non-current information and tells the memory device that this information is no longer current and should not be used. This, however, creates an invalid entry in a cache memory because the entry is no longer useable by the processor. Because this information is no longer useable by the processor, the cache memory is deprived of a useable memory location until the invalid entry is shifted out of the LRU replacement circuit as a replaceable address. This may take several cycles. Additionally, the greater the number of invalid entries in the cache memory, the smaller the cache memory will appear to the processor thereby causing fewer "hits" to the cache memory. The end result is that the cache memory is less effective when invalidated address information is not converted to replaceable addresses as quickly as possible. Therefore, a need exists for the cache memory to be able to handle this non-current, stale or invalid data.

SUMMARY OF THE INVENTION

According to the present invention, a method and circuit is provided for increasing the performance and efficiency of a many-way cache memory system using a Least Recently Used replacement procedure. The invention also provides a method for executing a Least Recently Used replacement mechanism in a computer system. The computer system includes an address content addressable memory and a register stack comprising at least an N most recently used entry register, an N+1 next most recently used entry register and an N+Z least recently used entry register, wherein N is any integer equal to or greater than 0, and Z is any integer equal to or greater than 2. Each register comprises a content that includes a binary number capable of representing an entry address. The method for executing a Least Recently Used replacement mechanism includes the steps of determining if a cache memory access operation in the address content addressable memory is being performed, generating a new entry address if the compare operation indicates a positive match in the address content addressable memory, transmitting the new entry address to a plurality of entry address comparators in the register stack, comparing the new entry address to entry addresses stored to in each register of the register stack except the MRU or N register, identifying a unique N+M register in the register stack that comprises the entry address where M is in the range of 1 to Z, and shifting the contents of registers N through N+M−1 to registers N+1 through N+M while shifting the new entry address into the N, or MRU, register. The method further defines the step of determining if a cache memory access operation in the address content addressable memory is being performed as including the step of determining if a compare operation or an address write operation is being performed in the address content addressable memory.

The present invention also provides a method of inhibiting an update of the LRU register stack in a multi-way cache memory system during a snoop compare operation caused by a snoop cycle. The system includes an address content addressable memory, a dynamic entry address bus, a LRU register stack and a stack control logic and wherein the first register stack includes at least an N and an N+1 next entry register for storing entry addresses wherein N is any integer equal to or greater than zero and wherein the N and the N+1 next entry registers comprise entry addresses. The method of inhibiting an update of the LRU register stack during a cache snoop operation caused by a snoop cycle includes the steps of: sensing a cache memory access operation in the address content addressable memory; sensing a snoop cycle in the address content addressable memory; and generating an inhibit signal responsive to the cache memory operation being executed in the address content addressable memory and the snoop cycle being executed in the address content addressable memory. Additionally, the step of generating an inhibit signal includes the steps of sensing an address compare operation in the address content addressable memory or sensing an address write operation in the address content addressable memory.

The present invention also provides a system and method for handling invalid data in a cache memory system employing a Least Recently Used replacement mechanism. The method is implemented in a multi-way cache memory system having an address content addressable memory, a dynamic entry address bus, a first register stack, a second register stack, stack control logic, a counter, a multiplexer in circuit communication with the first register stack and the second register stack and a LRU output. The first register stack includes at least an N and an N+1 entry register for storing entry addresses, wherein N is any integer equal to or greater than zero and wherein the N and the N+1 next entry registers comprise entry addresses. The second register stack includes at least an M invalid entry register for storing invalidated entry addresses wherein M is any integer equal to or greater than zero and a M to 1 input/output multiplexer which decodes the counter value and steers the dynamic entry address bus to one of M register inputs and steers one of the M register outputs to the stack output. The method of handling invalidated entry or way addresses in a register stack used to implement a Least Recently Used replacement algorithm for a multi-way cache memory includes the steps of: sensing an address invalidation operation in the stack control logic; outputting an entry address that corresponds to the system address on the dynamic true and complement entry address bus; outputting an invalid entry address signal from the stack control logic; directing the entry address through the multiplexer to the M register as a function of the counter value; recognizing that the second register stack includes at least one entry address; and incrementing the counter to indicate the number of entry addresses stored in the second register stack. The method further includes the steps of inhibiting an update operation in the first register stack and directing the output of the M register through the M to 1 multiplexer as a function of the counter value and outputting this entry address as LRU information. The second register stack further includes at least an M+1 invalid entry register. Each time an invalid entry from the second register is used to store new data, the counter is decremented and the invalid entry address is removed from the second register. Furthermore, the step of recognizing that the second register stack includes at least one entry address includes the step of setting a flag that indicates the presence of at least one entry address in the second register stack or, alternatively, the step of examining the counter value to determine if it is greater than a predetermined value, such as zero.

The step of sensing an address invalidation operation in the stack control logic includes the steps of: sensing an address write operation and sensing a snoop cycle. Alternatively, the step of sensing an address invalidation operation in the stack control logic can includes the steps of: sensing an address write operation and sensing valid bit status information.

Additionally, the step of sensing a snoop cycle includes the steps of sensing the cache data output control to determine if the cache data output is enabled while sensing a compare operation in the address content addressable memory. A compare operation with the cache data output disabled is recognized as a snoop operation by the present invention. As an alternative, a separate snoop input may be provided to indicate the execution of a snoop operation.

The present invention also provides a method of handling invalidated entry or way addresses in a register stack used to implement a Least Recently Used replacement algorithm for a multi-way cache memory system. The system includes an address content addressable memory, a dynamic entry address bus, a first register stack, a second register stack, stack control logic, a counter, a multiplexer in circuit communication with the first register stack and the second register stack. The first register stack includes at least an N and an N+1 next entry register for storing entry addresses wherein N is any integer equal to or greater than zero and wherein the N and the N+1 next entry registers comprise entry addresses. The second register stack includes at least an M invalid entry register for storing invalidated entry addresses wherein M is any integer equal to or greater than zero. The method of handling invalidated entry or way addresses in a register stack used to implement a Least Recently Used replacement algorithm for a multi-way cache memory includes the steps of: invalidating a system address stored in the address content addressable memory; outputting an invalidated entry address from the address content addressable memory to the dynamic entry address bus; inputting the invalidated entry address from the dynamic entry address bus to the M invalid entry register of the second register stack; setting a flag to indicate that the second register stack includes at least one entry address; incrementing a counter to indicate the number of entry addresses stored in the second register stack; shifting the address information in the N entry register to the N+1 next entry register in the first register stack; and storing a subsequent entry address in the N entry register of the first register stack when the invalidated entry is used for storing new information.

The method further includes the step of outputting entry address information stored in the second register stack and decrementing the counter to indicate the number of invalid entry addresses remaining in the second register stack when the invalidated entry is used for storing new information. Moreover, the step of invalidating the system address stored in the address content addressable memory via a snoop cycle includes the steps of sensing an address write operation and sensing valid bit status information.

In accordance with above described methods, the present invention also provides a Least Recently Used Replacement architecture for a cache memory. The architecture includes an N-way addressable content addressable memory for maintaining correspondence between system addresses and way addresses, an N-way data array in circuit communication with the N-way addressable content addressable memory and for storing data and an N-entry register stack for storing entry addresses wherein the N-entry register stack includes at least a first register, an intermediate register and a last register. Each register includes a plurality of bits wherein the plurality of bits include a number of bits associated with a binary address of each entry stored in the addressable content addressable memory. The intermediate and last registers further include a comparator for comparing a new entry address to the stored entry address. The first register further includes an address of a most recently used entry. The intermediate register further includes an address of a next most recently used entry and the last register includes an address of a least recently used entry.

The architecture also includes a second register for storing the address of the most recently used entry and a plurality of entry address encoders comprising N encoders. Each encoder including an input in circuit communication with the ACAM and for receiving a way select signal from the ACAM and an output in circuit communication with an entry address bus and for outputting entry address information. The architecture further includes an entry address write encoder circuit in circuit communication with the address content addressable memory and includes a plurality of bit input circuits that drive an inputted entry address onto the dual dynamic true and complement entry address bus during a write operation.

The architecture also includes register stack control logic for controlling the N-entry register stack and in circuit communication with the N-entry register stack and a precharge circuit. Also a wordline NOR circuit is in circuit communication with the ACAM and is for indicating whether the data array comprises a given datum of information. The wordline NOR circuit includes a plurality of wordline inputs in circuit communication with a plurality of wordline outputs from the ACAM.

A register stack feedback circuit is also included and is in circuit communication with the register stack control logic and N-entry register stack and is for feeding back to the register stack control logic the progress of a compare operation executed in the N-entry register stack. The register stack feedback circuit includes a true and complement entry bit input circuit, a stack feedback output circuit and a reset circuit in circuit communication with the stack feedback output circuit that includes a plurality of inverter gates for providing drive and appropriate circuit delay.

Also included in the architecture is a plurality of self timed entry address inverting driver circuits in circuit communication with the entry address encoders and the N-entry register stack and is for generating self-timed RTZ true and complement entry addresses onto a RTZ true entry address bus and a RTZ complement entry address bus. Each self-timed inverting dynamic entry address inverter circuit includes an RTZ entry address bit circuit for inputting an entry address, an output for outputting a RTZ entry address bit, and a self-timed reset input configured to reset the output as a function of a pair of RTZ true/complement address bits sampled from the RTZ true and complement entry address bus.

The architecture further includes an entry address bus for transmitting return-to-zero entry address to the N-entry register stack that is in circuit communication with the N-entry register stack and the entry address driver.

The present invention also provides a cache memory device for handling invalid entry or way data in a least recently used replacement algorithm. The cache memory device includes a first register stack for storing address information that includes at least a N and a N+1 next register wherein N is any integer greater than or equal to zero. The first register stack further includes a bit register having a first latching circuit for storing a true and complement entry address bit, a second latching circuit in circuit communication with the first latch and for storing a true and complement entry address bit, wherein the second latching circuit includes an input and an output, and a compare circuit for comparing the output of the second latching circuit to true and complement entry address bit on a RTZ (Return-To-Zero) true and complement entry address bus.

The cache memory device includes a dynamic entry address encoder for each way or entry for encoding a select entry address onto true and complement entry address busses. Each dynamic entry address encoder includes a discharge circuit for discharging a unique combination of pre-charged address bus lines, wherein the discharge circuit includes a wordline or way input. A wordline or way input is used to receive a wordline or a way select signal. In general, a way select signal is any wordline signal or any other signal that indicates activation of a way or entry in a data array. Additionally, the cache memory device further includes a dynamic entry address write encoder circuit that includes a plurality of entry address bit inputs and is in circuit communication with the address content addressable memory and the dual dynamic true and complement entry address bus.

The cache memory device further includes a plurality of self-timed inverting dynamic entry address inverting driver circuits for generating self-timed RTZ true and complement entry addresses onto a RTZ true entry address bus and a RTZ complement entry address bus. Dual complementary signals (i.e. true and complement) enable the inverting address drives to provide logically correct outputs by reversing input logic sense because some circuits may employ compliment inputs and others true inputs. Complementary inputs generate the true outputs and the true inputs generate the complementary outputs. The self-timed inverting dynamic entry address inverter circuit includes an entry address bit circuit for inputting an entry address, an output for outputting a RTZ entry address bit, and a self-timed reset input configured to reset the output as a function of a pair of RTZ true/complement address bits sampled from the RTZ true and complement entry address bus. The cache memory device also includes a dynamic entry address bus in circuit communication with the dynamic entry address encoders, a pre-charge circuit and the self-timed inverting dynamic entry address inverter circuit and for transmitting true and complement entry addresses. A RTZ true/complement entry address bus connects the self-timed inverting dynamic entry address inverter circuits to the LRU register stack.

A self-timed first register stack feedback circuit is also included in the cache memory system and is in circuit communication with RTZ true/complement entry address bus and is for measuring the progress of a first register stack compare operation. The self-timed first register stack feedback circuit includes a RTZ true and complement entry bit input circuit, a stack feedback output circuit, and a reset circuit in circuit communication with the stack feedback output circuit and includes a plurality of inverter gates for providing drive and appropriate circuit delay.

The cache memory device also includes stack control logic in circuit communication with the self-timed register stack feedback circuit, dynamic entry address encoder, the first register stack and the pre-charge circuit, and is for controlling the first register stack input and output. The stack control logic includes a stack update circuit which includes stack inhibit update logic for inhibiting an update operation of the first register stack and an invalid entry address status circuit for generating an invalid entry address status signal. The stack update circuit includes a compare entry address operation input circuit for sensing the status of a compare entry address status signal, a snoop operation input circuit for sensing the status of a snoop operation status signal, an address write operation input circuit for sensing the status of an address write signal, and a stack update output for generating a stack update output signal. The stack update signal is not generated under certain circumstances so as to inhibit the update of the first register stack. The stack control logic also includes an invalid entry address status output for generating an invalid entry address status signal. The invalid entry address status circuit includes a valid bit status input circuit for inputting the status of an entry address valid status bit and an invalid entry address status output circuit for generating an invalid entry address status signal. Alternatively, a snoop input circuit may be provided directly for sensing the presence of a snoop operation in the address content address memory.

The cache memory device further includes an MRU output register in circuit communication with the stack control logic and self-timed inverting dynamic entry address inverter driver circuit and is for storing a most recently used entry address. The MRU output register includes a true entry address bit input circuit for receiving a true entry address bit, a complement entry address bit input circuit for receiving a complement entry address bit, an MRU entry bit output for outputting an MRU entry bit, and a reset circuit for resetting the MRU entry bit output. The MRU output register also provides entry address information to the cache control logic during SNOOP address compare operation. This information is available even if the first register stack update is inhibited and provides the entry address to which the subsequent address invalidation operation is directed. The reset circuit includes a reset low circuit for resetting the MRU entry bit to a logic low level and a reset high circuit for resetting the MRU entry bit to logic high level.

Of particular importance, the cache memory device further includes a second register stack for storing address information in circuit communication with the self-timed inverting dynamic entry address inverting driver circuits. The second register includes at least an M register wherein M is any integer equal to or greater than zero and the M register includes a bit register circuit for storing an entry address bit. The bit register circuit includes an input and an output.

The cache memory device also includes a counter control circuit in circuit communication with the stack control logic and a LRU output multiplexer and for controlling the LRU output and a counter circuit for counting the number of entry addresses stored in the second register.

It is therefore an advantage of the present invention to provide method of handling invalid information in a least recently used replacement mechanism by providing a second register stack to which invalidated information can be placed and shifted out of the cache memory circuit.

It is a further advantage of this invention to provide a method and architecture for handling invalid information in a least recently used replacement mechanism without changing the lease recently used register stack.

It is a further advantage of this invention to provide a method and architecture for implementing an efficient LRU replacement mechanism in a many-way cache memory chip.

The method and apparatus of the present invention thus provides a method and architecture for improving cache memory performance by retaining a true LRU replacement scheme in a fully associative many-way cache memory and by reducing and/or eliminating invalid information in the LRU register stack while maintaining the overall LRU stack performance and functionality.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 2A is a block diagram of a LRU replacement mechanism employing a dual complementary address bus architecture.

FIG. 8A is a circuit diagram illustrating a second clock generation circuit.

FIG. 8B is a circuit diagram illustrating a second clock generation circuit having a snoop function input.

DETAILED DESCRIPTION OF THE ILLUSTRATED EMBODIMENTS

Figure 1:
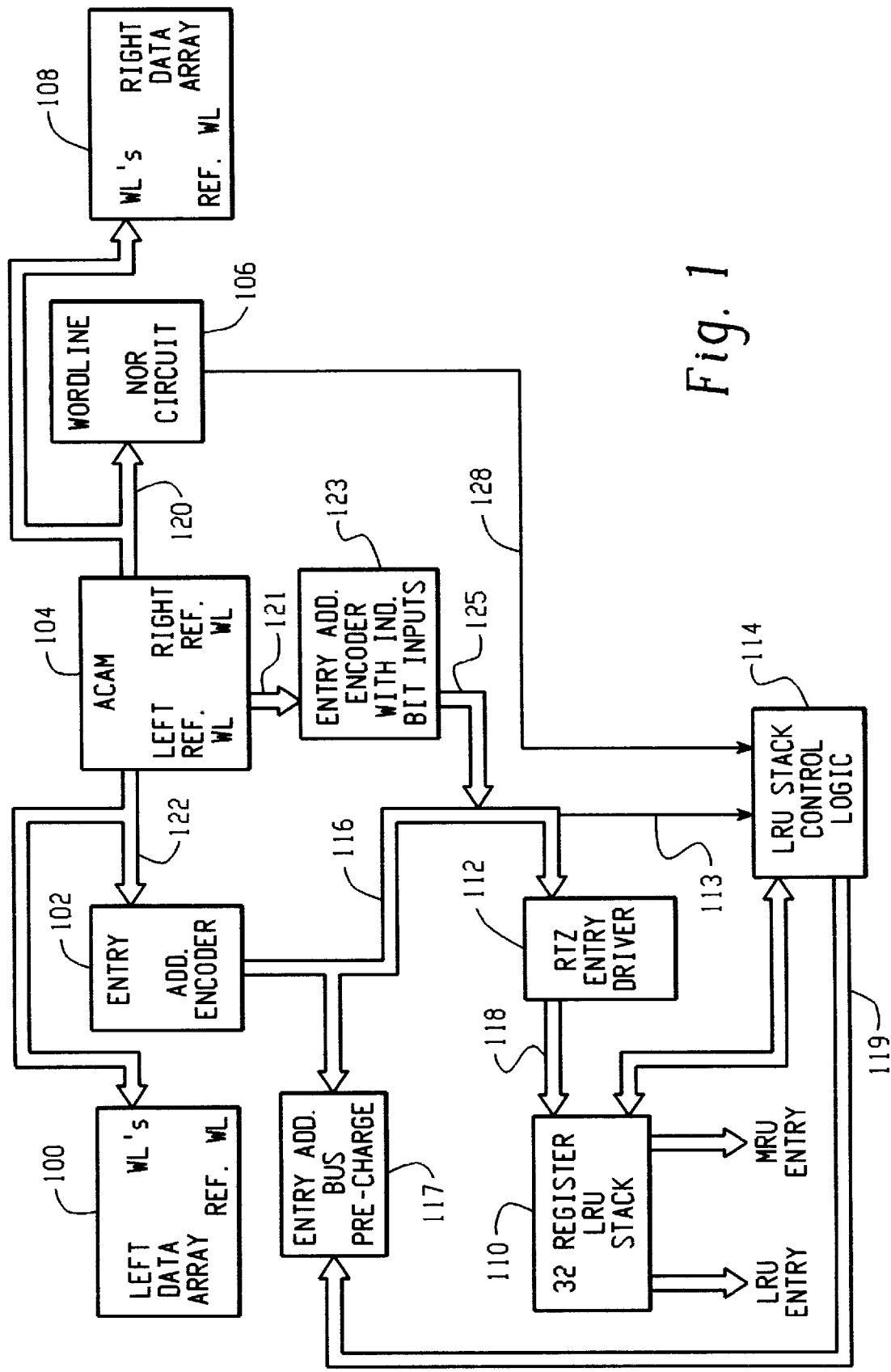
FIG. 1 is a block diagram of a cache memory system of the present invention illustrating various components and their interconnectivity.

The present invention relates to a multi-way cache that includes 32 ways. Each "way" is codified into one of 32 entry addresses (or way addresses). Generally, the entry addresses are stored in the LRU stack. When a new datum is placed in the data cache, it is assigned to an entry (or way) which the LRU stack indicates is the least recently used entry or way (i.e. the LRU output of the LRU stack), overwriting the old data which was previously stored at the same entry (or way).

The system address of the datum (stored in the data portion of the cache) is stored in the Address CAM (content addressable memory). The Address CAM (ACAM) maintains the correspondence between system addresses and entry addresses. When data is placed into a data cache entry, a corresponding entry location in the ACAM is updated with the system address so that the relation of the system address to entry addressed is maintained in the ACAM.

Generally, the size of the datum employed can be up to four L1 lines of data (i.e. 256 bytes), which amount to a total data storage size of 4 KB across all 32 entries (or ways). Our cache memory was organized around the L1 line size because it is used as a L1 line buffer.

When the cache memory is queried to see if it is holding data needed by the system, a system address is presented to the ACAM and broadcast to all 32 of its stored system addresses for a compare operation. If any of the entries generates a match to the presented system address, the data in the corresponding data cache entry is given to the system if the data cache outputs are enabled. However, a query of the ACAM can be performed to find out if the system address resides somewhere in the ACAM by performing a query without enabling the data cache outputs. This kind of operation is called a SNOOP.

Alternatively, the system could inform the cache memory that it is performing a snoop cycle with a dedicated SNOOP input to the cache memory. Moreover, snoop operations may also be performed to query memory devices to determine if they are holding invalid data. Illustrated in Table 1 are the various input signals and their sources that will hereinafter be referred to in the detailed description of the invention. The particulars of the present invention's architecture for and method of handling invalidated entry or way addresses in a register stack implementing a true LRU replacement algorithm for multi-way cache will now be presently described.

TABLE 1

| Input Signal | Signal Source |
| --- | --- |
| WORDLINE[0:31] (FIG. 2A) | ACAM 104 |
| RESET (FIG. 2B) | Memory Controller |
| WORDLINE No. 3 (FIG. 3) | ACAM 104 |
| ENTADTC (FIG.'s 4A & B) | Dynamic Entry Address Bus 116 |
| RESET (FIG. 4A) | Reset Enable 203 |
| CMPADENN (FIG. 4B) | LRU Stack Control Logic 114 |
| MATRES (FIG. 5) | LRU Stack Control Logic 114 |
| T & C (FIG. 5) | RTZ True and Complement (T/C) Entry Address Buses (220 & 218) |
| RESET LOW & HIGH (FIG. 6) | LRU Stack Control Logic 114 |
| FIRST CLOCK (FIG. 6) | LRU Stack Control Logic 114 |
| GATED 2D CLOCK (FIG. 6) | LRU stack 110 |
| IN1 & $\overline{IN1}$ | LRU stack 110 (previous register) |
| RTZ TRUE ENTRY BIT (FIG. 6) | RTZ True and Complement (T/C) Entry Address |

TABLE 1-continued

| Input Signal | Signal Source |
| --- | --- |
| | Buses (220 & 218) |
| RTZ COMPLEMENT ENTRY | RTZ True and Complement (T/C) Entry Address |
| BIT (FIG. 6) | Buses (220 & 218) |
| BIT 0–BIT 4 (FIG. 7) | RTZ True and Complement (T/C) Entry Address Buses (220 & 218) |
| SECOND CLOCK (FIG. 7) | LRU Stack Control Logic 114 |
| STACK FEEDBACK SIGNALS (FIG.'s 8A & B) | Stack Feedback Circuit 202 |
| SNOOPN (FIG. 8B) | Memory Controller |
| RESET LOW & RESET HIGH (FIG. 9) | LRU Stack Control Logic 114 |
| RTZ ADDRESS TRUE (FIG. 9) | RTZ True and Complement (T/C) Entry Address Buses (220 & 218) |
| RTZ ADDRESS COMPLEMENT (FIG. 9) | RTZ True and Complement (T/C) Entry Address Buses (220 & 218) |
| RESET (FIG. 10A) | LRU Stack Control Logic 114 |
| REGCLK2 (FIG. 10A) | LRU Stack Control Logic 114 |
| CMPD (FIG. 10A) | ACAM 104 |
| SNOOPN (FIG. 10A) | Memory Controller |
| AWED (FIG. 10B) | ACAM 104 |
| AWED (FIG. 11B) | ACAM 104 |
| LBVALID1 (FIG. 11B) | Memory Controller |
| LBVALID0 (FIG. 11A) | Memory Controller |
| PHI2 (FIG. 11A) | Memory Controller |
| AWED (FIG. 11C) | ACAM 104 |
| INVALID (FIG. 12) | LRU Stack Control logic 114 |
| AWECLK (FIG.'s 12 & 10C) | ACAM 104 |
| COUNTER CONTROL (FIG. 12) | Counter Control 234 |

LRU Replacement Mechanism Architecture.

Referring now to the drawings, and for the present to FIG. 1, a block diagram of a cache memory system of the present invention illustrating various subcomponents and their interconnectivity is shown. The architecture employs a left data array 100 and a right data array 108, a centrally located address comparator (ACAM) 104, a thirty-two register LRU stack 110, LRU stack control logic 114, a dual dynamic true/complement (T/C) entry address bus 116, a dynamic entry address encoders 102, return-to-zero (RTZ) T/C entry address compare bus 118, RTZ T/C entry address inverter/driver 112, an entry address bus pre-charge circuit 117, an entry address encoder with individual address bit inputs 123 and a thirty-two wide wordline NOR structure 106 as indicated by left wordline bus 122 and right wordline bus 120. The left wordline bus 122 and right wordline bus 120 are activated simultaneously by the ACAM 104 and include the same information. The thirty-two register LRU stack 110 maintains a register stack architecture that includes thirty-two, five-bit encoded entries ordered in a most recently used (MRU) to least recently used (LRU) order. The first entry in the register stack contains the MRU entry and is called a MRU register. The last entry in the register stack contains the LRU entry and is called a LRU register.

The ACAM 104 functions as a fully associative cache-tag structure comprising thirty-two tags of twenty-seven bits each. In a compare operation, a twenty-five bit address is associatively compared with all ACAM 104 entries and two state bits to check validity. A "hit" in the ACAM 104 enables activation of clocked wordline driver circuits located in the ACAM 104. During a "hit," an entry address value is encoded by the dynamic entry address encoders 102. The dynamic entry address encoders 102 transmit the entry address value (i.e. address) to the RTZ T/C entry inverter driver circuits 112 via dual dynamic T/C entry address bus 116. However, during an address write, ACAM 104 transmits the address via address write bus 121 to entry address encoder 123 that includes single address bit inputs and generates therefrom a dual dynamic entry address on bus 125.

The RTZ T/C entry inverter drivers 112 generate true and compliment entry addresses that are sent to the thirty-two register LRU stack 110 via the RTZ T/C entry address compare bus 118. The RTZ T/C entry address compare bus 118 supplies RTZ encoded T/C entry addresses to the LRU stack from fast, self-timed circuits that are included within the RTZ T/C entry address driver 112. The RTZ encoded T/C entry addresses are used to update the MRU register and to broadcast to all register stack comparators in the thirty-two register LRU stack 110 the entry new address. The register comparators determine where the current hit entry previously resided in the thirty-two register LRU stack and generates a shift pulse to move all more-recent entries down one register position in the stack. The wordline NOR circuit 106 determines if a given access to the ACAM 104 is a "hit" or a "miss" earlier than a cache hit output signal would. A "hit" or a "miss" is reported to the LRU stack control logic 114 via the wordline NOR output signal 128.

Referring now to FIG. 2A, one embodiment of the present invention illustrating a dual complementary address bus architecture for improved stack operations is shown. The embodiment of FIG. 2A employs the overall system architecture of FIG. 1, with FIG. 2A focusing on the particularities of the embodiment. In particular, the architecture includes stack control logic 114, stack feedback circuit 202, a 32 register LRU stack 110, a reset enable circuit 203, RTZ Inverter/Driver circuits 112 and 112A and entry address encoders 102 and 123. The stack control logic 114 is in circuit communication with the register stack 212 and the reset enable circuit 203 via control bus 115 and is responsible for controlling stack operations such as loading, shifting, and entry address compare. The stack control logic 114 further includes a true and complement entry address bit pair bus input from bus 113 to control timing of the pre-charge circuit 117 via timing bus 119. The RTZ Inverter/Driver circuits 112 and 112A are in circuit communication with the register stack 212 via RTZ true and complement (T/C) entry address buses 220 and 218 and is further in circuit communication with the entry address encoders 102 via true and complement entry address buses 205A and 205B (shown collectively as bus 116 in FIG. 1). The RTZ Inverter/Driver circuits 112 and 112A are also in circuit communication with entry address encoder 123 that includes individual entry address bit inputs via buses 201A and 201B (shown collectively as bus 125 in FIG. 1). The stack feedback circuit is in circuit communication with the register stack 212, the reset enable circuit 203 and the stack control logic 114 and is responsible for gauging the progress of stack operation. The entry address encoders 102 and 123 are further in circuit communication with ACAM 104 (shown in FIG. 1) through wordline bus 122 (shown as "WORDLINE [0]" etc. in FIG. 2A) and T/C entry address inputs (shown as bus 121 in FIG. 1).

The register stack 212 includes thirty-two registers, each five bits wide, arranged in a stack architecture. The top register, REG. 0, holds the MRU entry. The bottom register, REG. 31, holds the LRU entry. The first register stack 212 includes a stack architecture that supports shift operations between registers. For example, the contents of REG. 0 can be shifted to REG. 1 and the contents of REG. 1 can be shifted to REG. 2 and so on.

Figure 3A:
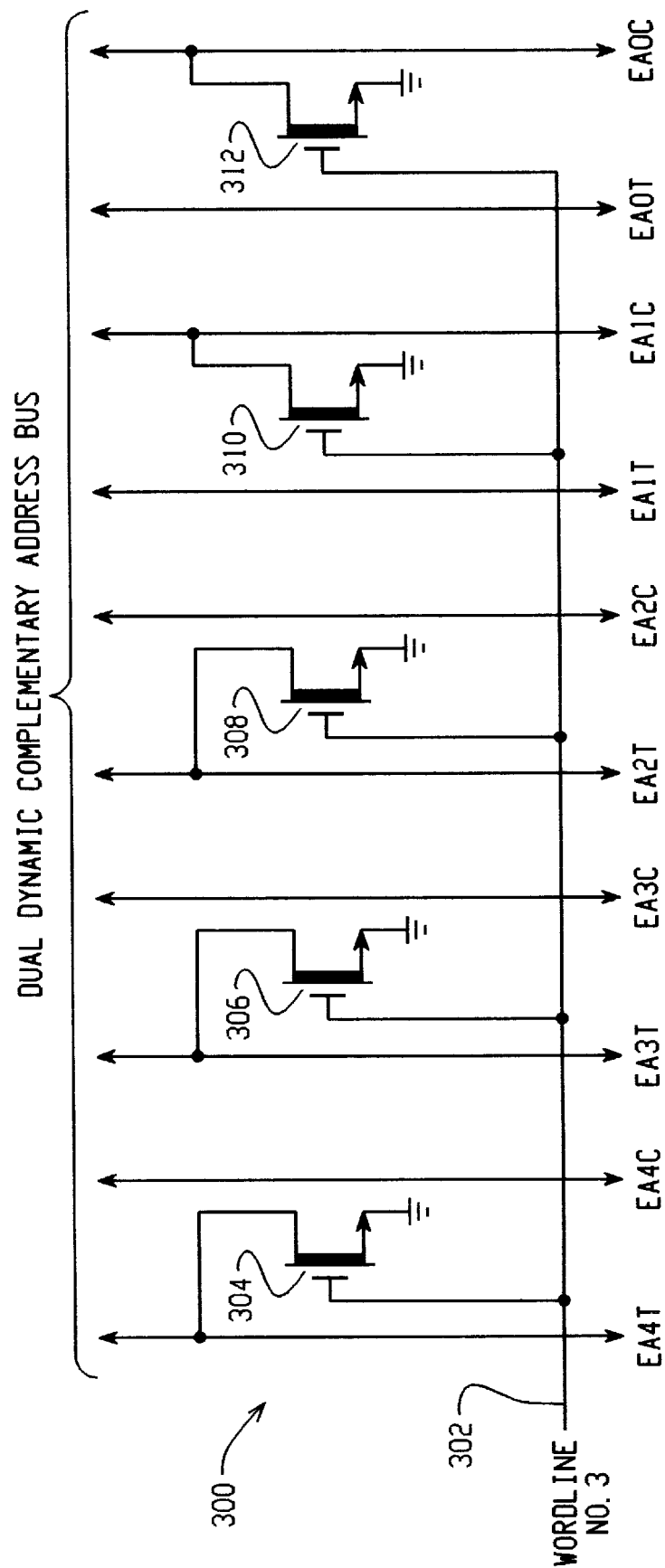
FIG. 3A is a circuit diagram illustrating an entry address encoder circuit for generating dual dynamic true/complement address buses.
Figure 3B:
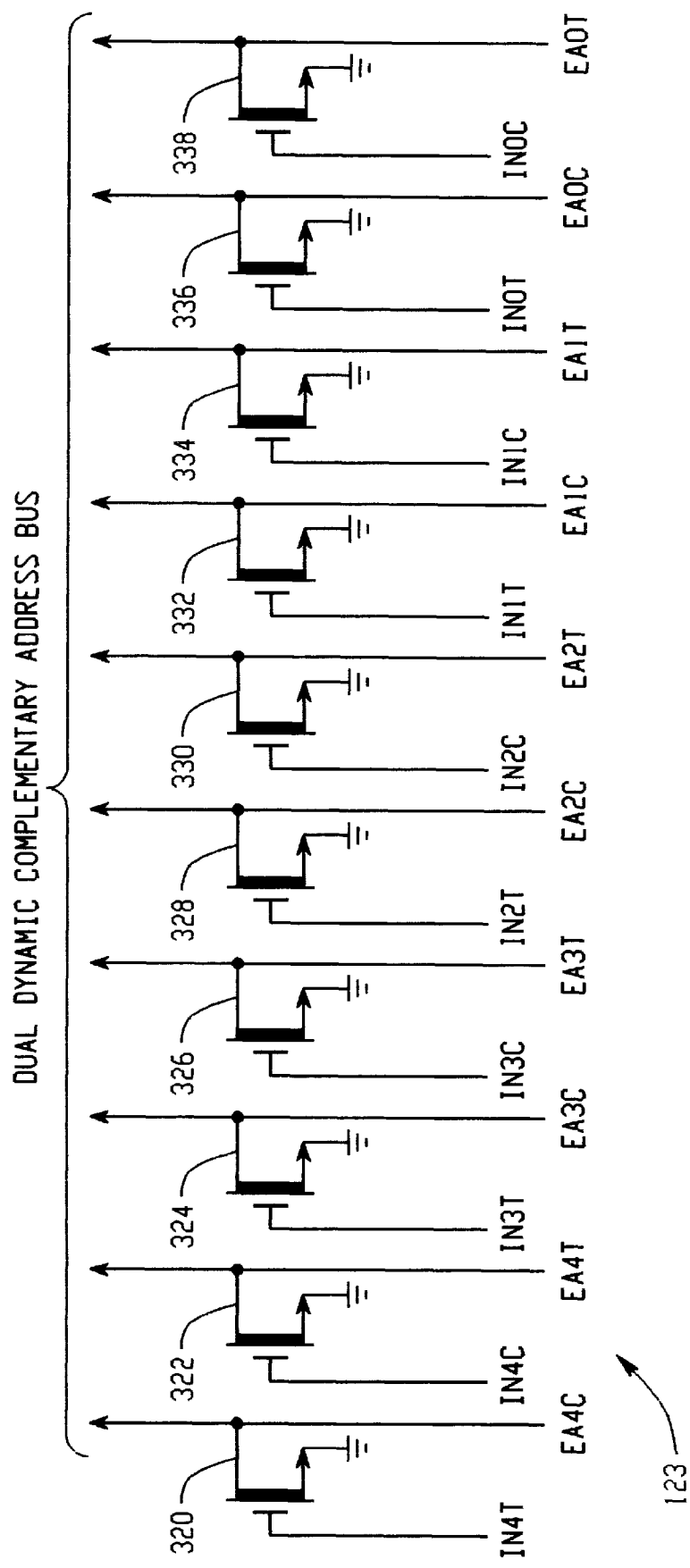
FIG. 3B is a circuit diagram illustrating an encoder with individual address bit inputs.
Figure 4A:
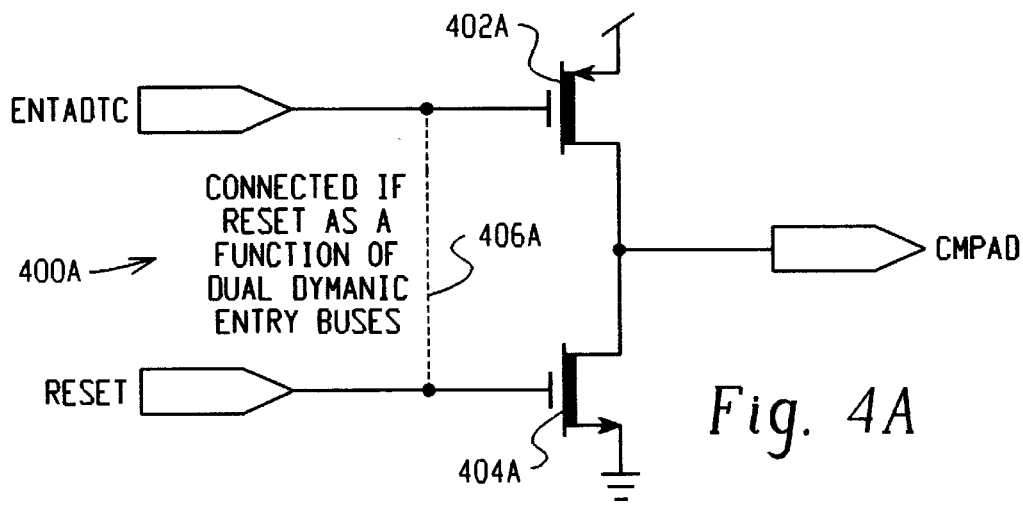
FIGS. 4A and 4B are circuit diagrams of alternative embodiments of a Return To Zero (RTZ) true/complementary self-timed inverting circuits.
Figure 4B:
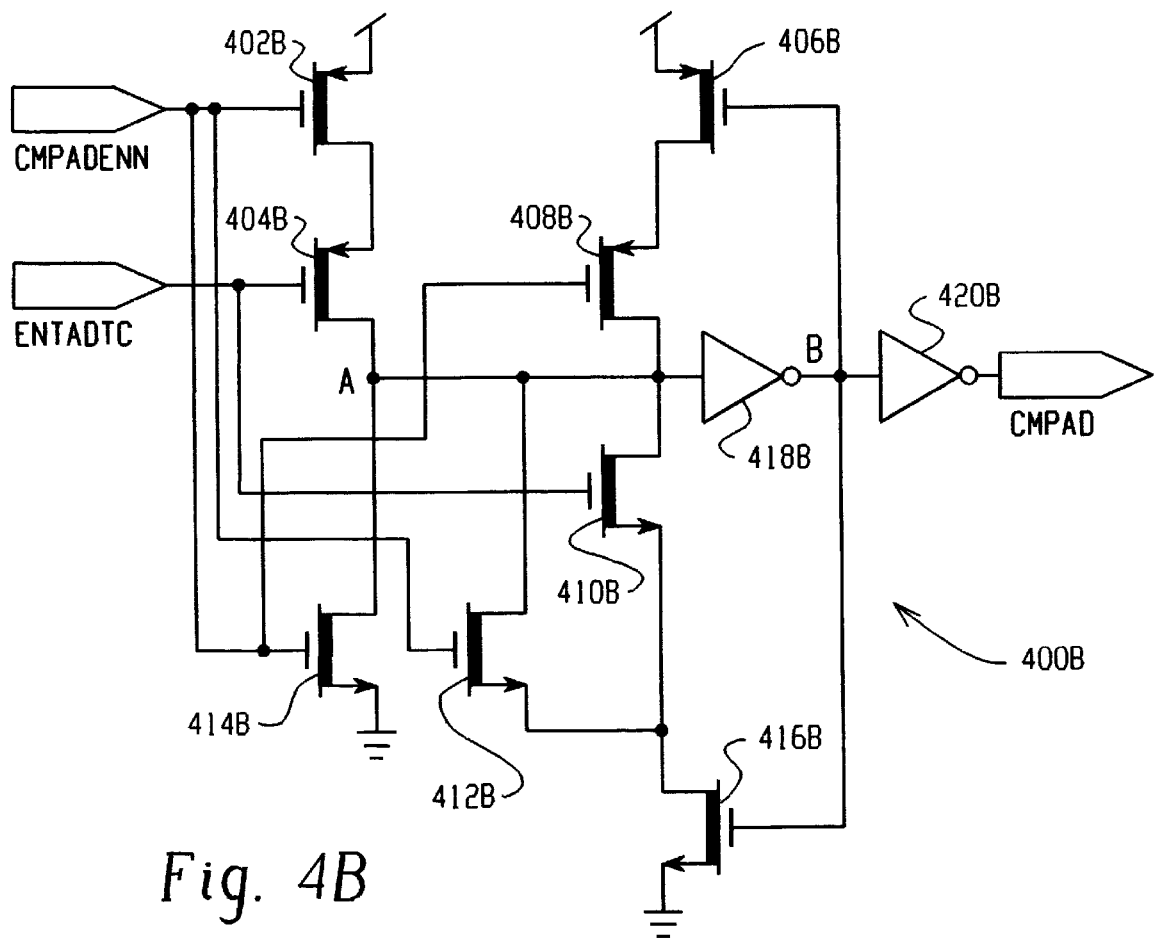
Figure 5:
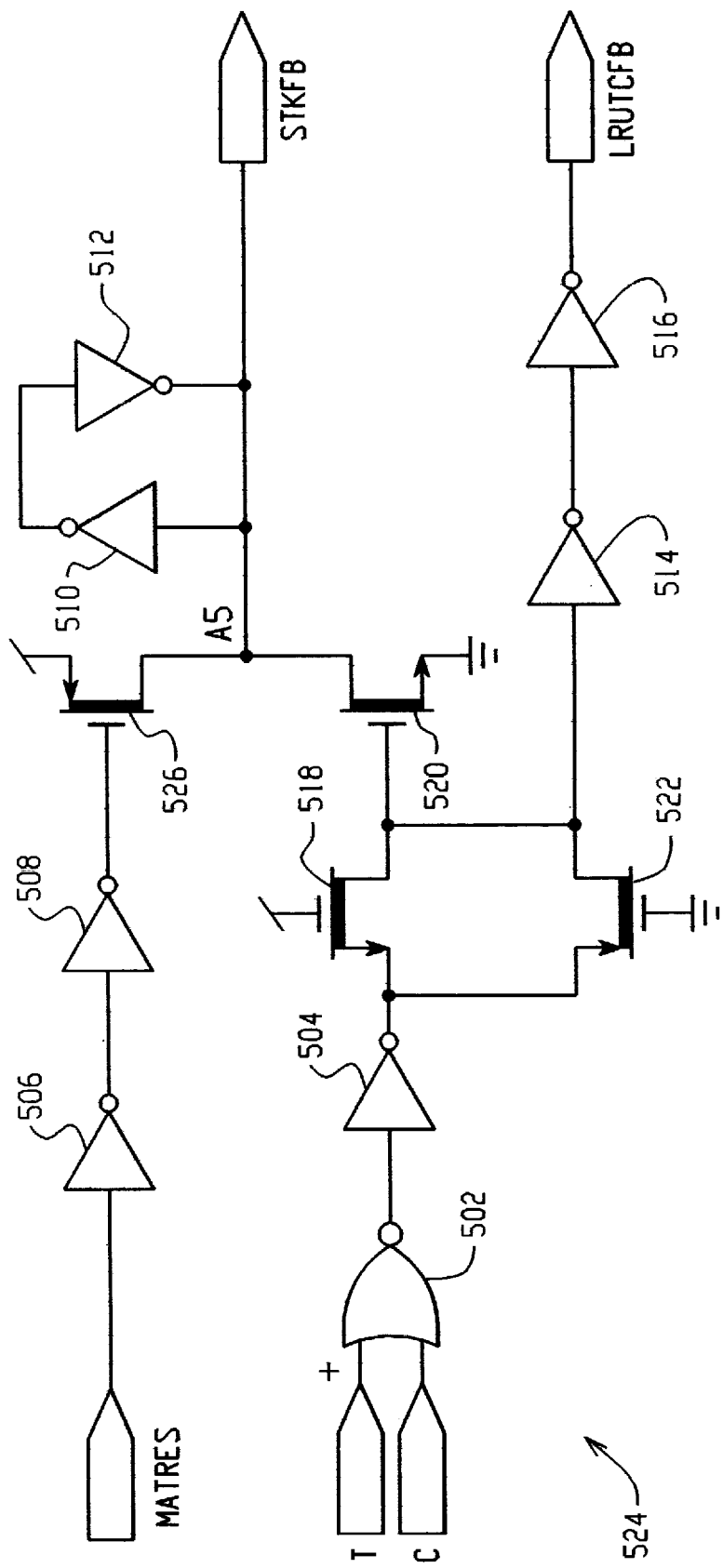
FIG. 5 is a circuit diagram illustrating a stack feedback circuit.
Figure 6:
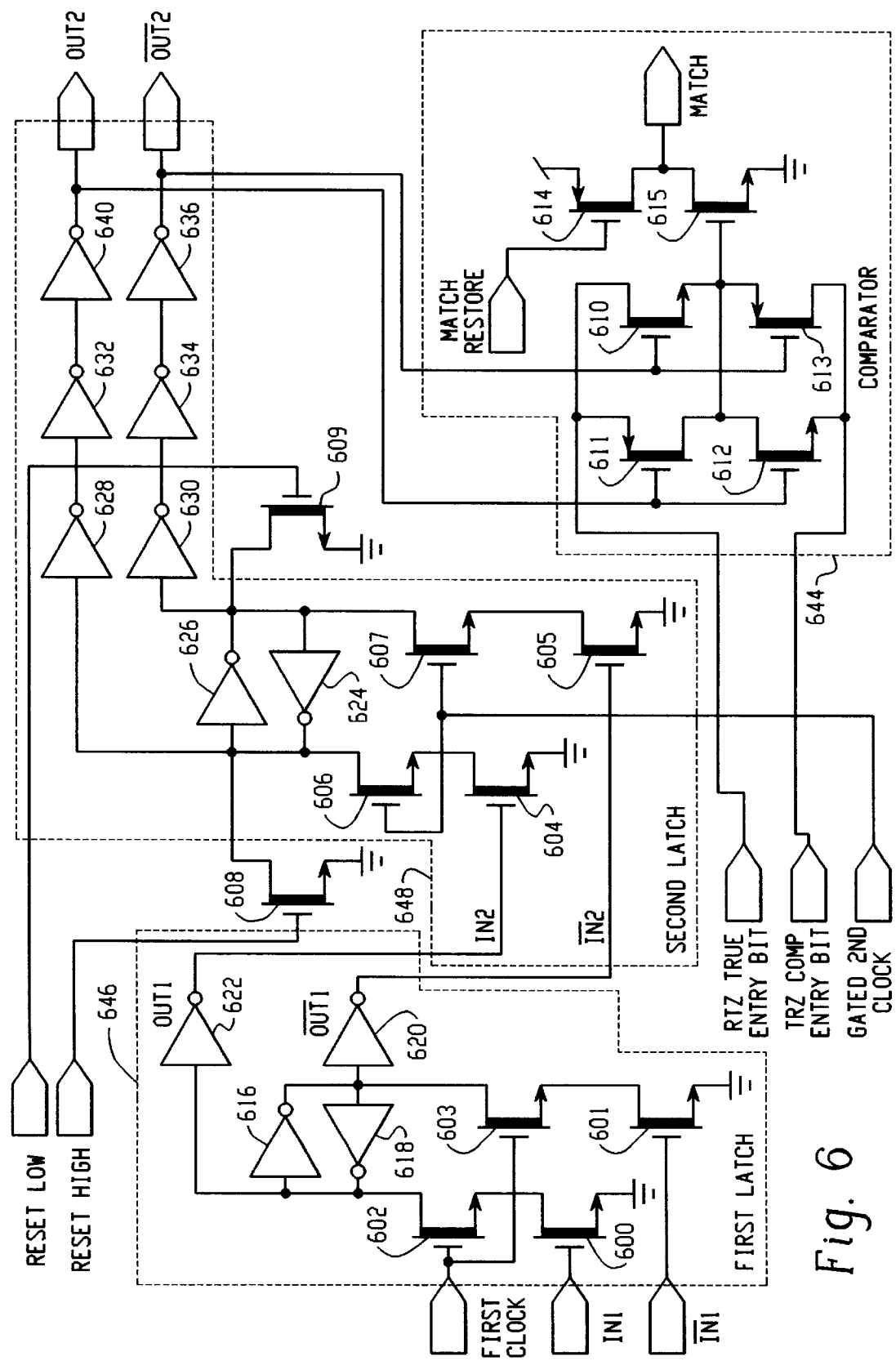
FIG. 6 is a circuit diagram illustrating a memory circuit for storing a bit of entry address information in the first register stack.
Figure 7:
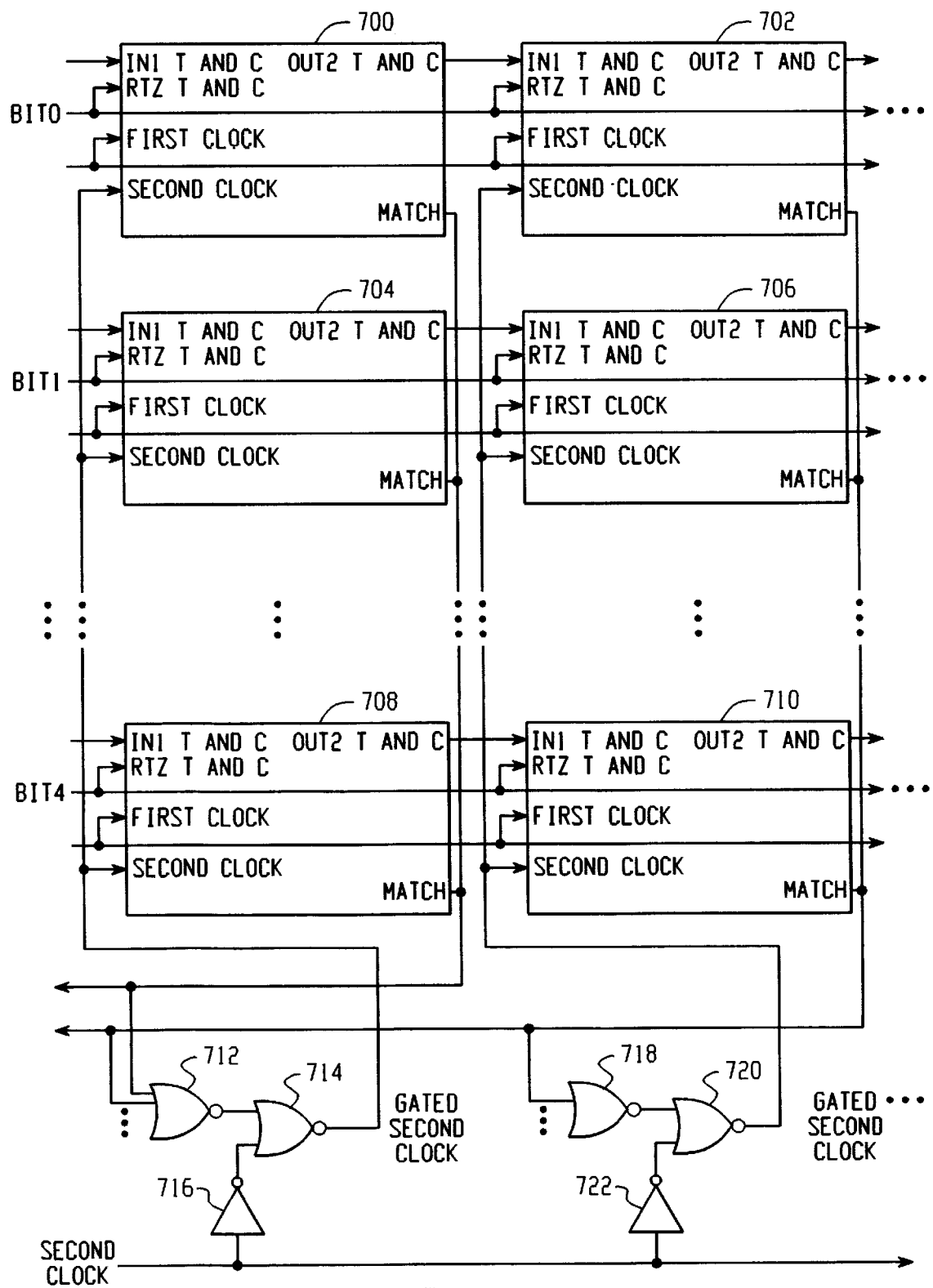
FIG. 7 is a block diagram illustrating certain components of the first register stack.

The RTZ Inverter/Driver circuits 112 and 112A are illustrated in FIGS. 4A and 4B and discussed in the text, infra, associated with the figures. Similarly, a discussion of the details of an entry address encoder of entry address encoders 102, which is shown is FIG. 3A, entry address encoder 123 with individual inputs, which is shown in FIG. 3B, the stack feedback circuit 202, which is shown in FIG. 5 and the 32 register LRU stack 110, which is shown in FIGS. 6 and 7, is discussed with the text associated with such figures. Although the present discussion does not necessitate a discussion of the circuits mentions, supra, the reader is may refer to the appropriate figures and text as desired. Accordingly, the present discussion will now focus on the operation of the present embodiment.

To briefly review, the LRU replacement mechanism of the present invention stores entry address and entry address usage information in a register stack from top to bottom, or vice-versa. The top register typically contains the MRU information, and the bottom register typically contains the LRU information. The register stack typically employs a push-down architecture where the MRU information stored at the top of the register stack and may eventually be pushed down to the very bottom of the register stack, or the LRU register. Therefore, by maintaining MRU information and by shifting out LRU information, it is more probable that a "hit" will occur in the cache memory because new information that is stored in the cache will be placed in locations (i.e. entries) that have not been requested after many read operations and information (i.e. addresses) that has been frequently referenced tends to remain present in the cache.

Figure 2B:
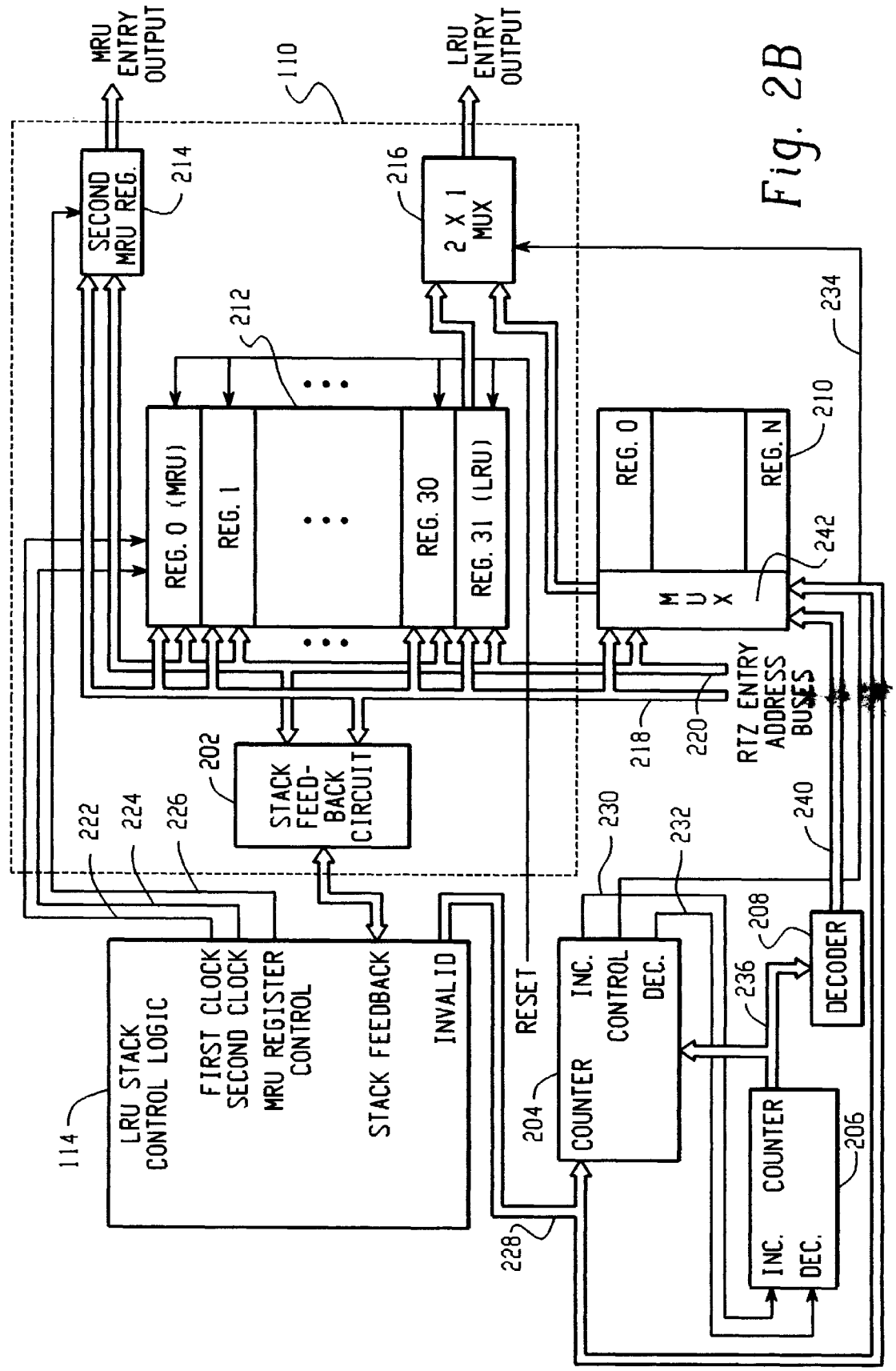
FIG. 2B is a block diagram of a second embodiment of a LRU replacement mechanism employing a first and second register stack.

Referring now to FIGS. 1 and 2B, the present embodiment is triggered when either a "compare" operation or an "address write" operation is performed in the ACAM 102. If a "compare" operation results in a "hit" in the ACAM 102, an entry address encoder in entry address encoders 102 generates an entry address that is driven onto true/complement entry address buses 205A and 205B. The entry address is a binary address representing the address of the activated entry wordline. The newly generated entry address transmitted to the RTZ Inverter/Driver circuits 112 and 112A which, in turn, transmit the entry address to the 32 register LRU stack 110.

The entry address is then loaded into the Most Recently Used (MRU) register (REG. 0). Every other entry register (REG. 1 to REG. 31) of the register stack 212 includes a comparator circuit (not shown in FIG. 2A) that compares the contents of the entry register with the entry address present on RTZ entry address buses 218 and 220. If any entry register (REG. 1 through REG. 31) includes the same entry address as RTZ T/C entry address buses 220 and 218, thereby indicating a matching condition, that register location is flagged by an affirming match signal to identify the register as a matching entry register.

Once the matching entry register is identified, the contents of the more recent entry registers are shifted downward toward the matching register with the ultimate effect of overwriting the contents of the matching register with the contents of the next most recently used entry register. For example, if REG. 5 is identified as a matching entry register (i.e. including the same entry address as present on as RTZ entry address buses 218 and 220), the entry address matching REG. 5 is placed into REG. 0 while the contents of entry registers REG. 1 to REG. 4 will be shifted so that the former contents of REG. 0 are stored in REG. 1, the contents of REG. 2 are stored in REG. 3, . . . etc., until the contents of REG. 4 are stored in the matching entry register REG. 5. In this manner, the updating of all registers in the stack is performed in one, single shifting operation which occurs in all the more recent registers in the stack at the same time.

Because a new LRU address calculation is generated by an entry address compare operation which occurs in all stack registers less recent than the MRU register at the same time, followed by a single shift operation which occurs in all the more recent stack registers at the same time, the LRU address calculation time does not increase geometrically with increasing numbers of ways or entries where as an LRU address calculation performed using non-associative means experiences circuit count and delay which increases geometrically with an increase of the numbers of ways or entries in the cache. An LRU address calculation using associative ordering provides a faster and more efficient calculating means for caches and other memory systems with a large numbers of ways or entries and beyond.

Invalid Data Handling LRU Replacement Mechanism

Referring now to FIG. 2B, a block diagram of a second embodiment of a LRU replacement mechanism employing a first register stack 212 and a second register stack 210 is shown. The first register stack 212 includes thirty-two registers, each five bits wide, arranged in a stack architecture. The top register, REG. 0, is the MRU entry. The bottom register, REG. 31, is the LRU entry. The first register stack 212 includes a stack architecture that supports shift operations between registers. For example, the contents of REG. 0 can be shifted to REG. 1 and the contents of REG. 1 can be shifted to REG. 2 and so on.

The second register stack 210 includes N registers, where N can be any integer value greater than zero and up to the size of the first register stack 212. In the illustrated embodiment, first register stack 212 includes thirty-two registers. Therefore, the second register stack 210 may include up to thirty-two registers. However, for exemplary purposes, it will be assumed that the second register stack 210 includes four registers (i.e. N=4). The second register stack 210 also includes a register I/O multiplexer 242 whose operation will hereinafter be described in further detail.

Still referring to FIG. 2B, the LRU replacement mechanism further employs LRU stack control logic 114, a stack feedback circuit 202, a counter control 204, an invalidated entry address counter 206, a decoder 208, a second MRU register 214 and a LRU output multiplexer 216. The RTZ T/C entry driver 112 (shown in FIG. 1) drives a RTZ true entry address compare address bus 218 and a RTZ compliment entry address compare bus 220, hereinafter collectively referred to as the RTZ entry address buses 218 and 220. The RTZ entry address buses 218 and 220 input true and compliment entry addresses into each register of the first register stack 212, the register I/O multiplexer 242 and the second MRU register 214, and the stack feedback circuit 202.

The LRU stack control logic 114 provides a first clock 222 and a second clock 224 to the first register stack 212. The LRU stack control logic 114 also provides a MRU register control 226 to the second MRU register 214. The LRU stack control logic 114 also provides an invalid entry address status signal 228 to the counter control 204.

The counter control 204 has as outputs an increment signal 230 and a decrement signal 232 both of which are fed into the invalidated entry address counter 206. The counter control 204 further includes a control output 234 that is fed into LRU output multiplexer 216. The invalidated entry address counter 206 has a counter output bus 236 which is fed into the decoder 208 and fed back into counter control 204. The decoder 208 decodes the counter value supplied by counter output bus 236 into multiplexer selection signals that are fed into register I/O multiplexer 242 via decoder output bus 240.

To recall, the LRU replacement mechanism of the present invention stores entry address and entry address usage information in a register stack from top to bottom, or vice-versa. The top register typically contains the MRU information, and the bottom register typically contains the LRU information. The register stack typically employs a push-down architecture where the MRU information stored at the top of the register stack and may eventually be pushed down to the very bottom of the register stack, or the LRU register. Therefore, by maintaining MRU information and by shifting out LRU information, it is more probable that a "hit" will occur in the cache memory because new information that is stored in the cache will be placed in locations (i.e. entries) that have not been requested after many read operations and information (i.e. addresses) that has been frequently referenced tends to remain present in the cache.

However, the register stack may contain entry addresses which have been invalidated that no longer represent "use" information (i.e. invalidated information). To recall, information in a cache memory becomes stale, old or invalid when the information has been modified in some areas of memory and not in others. Accordingly, a snoop operation is generated to invalidate stale, old or invalid data that may reside in other system memories, such as the cache memory. Since the information in the cache (and register stack) is now invalid and occupies an entry in the register stack, the register stack now includes what is known as a "bubble." A "bubble" is a register entry that is no longer usable by the cache memory because it contains invalid information. Therefore, a 32 entry register stack will be, in effect, a 31 entry register stack until the invalidated entry exits the stack via the LRU entry. Accordingly, as the number of invalidated entries in the register stack becomes larger, the smaller the register stack appears.

On power up and system reset the cache and LRU logic must be initialized. The first register stack 212 for the LRU replacement mechanism has no prior entry address usage to reference at power up so the register stack is arbitrarily ordered from most recent to least recent entry addresses during initialization. This insures that all registers in the stack hold unique entry addresses.

Referring to FIGS. 1, 2A and 2B, at initialization the ACAM 104 contains no valid addresses and all valid status bits are initialized to an invalid state. Since there are no valid addresses in the ACAM 104, an address compare operation in the ACAM 104 will generate a "miss" in the cache memory. As a result of the miss, the requested data will be placed in the data array and the corresponding system address will be placed in the ACAM 104 setting one or more valid status bits to the valid state. When the ACAM 104 is loaded with this new system address, the corresponding ACAM 104 entry address will be placed as a new MRU entry address at the top of the first register stack 212. The next address compare operation in the ACAM 104 that also generates a "miss" will result in another entry address being placed in the MRU entry of the first register stack 212. The information previously residing the MRU entry register (REG. 0) is pushed down into the next succeeding entry register, that is REG. 1.

However, after some time and the cache is filled, an address compare operation in the ACAM 104 may also generate a "hit." In such a case, the "hit" indicates that the cache memory includes data which corresponds to a presented system address. The corresponding entry address in the register stack 212 will be replaced by that of the next most recent register, while at the same time being placed in the MRU entry, or REG. 0. For example, if the corresponding entry address in the register stack 212 is located in REG. 10, all of the entry information that resided in the registers preceding REG. 10 (i.e. REG. 0 to REG. 9) is shifted down the register stack such that the entry information that was in REG. 0 is now in REG. 1 and so on until the entry information the resided in REG. 9 is now in REG. 10. The RTZ T/C entry buses 218 and 220 would transmit the entry information into the MRU entry of the first register stack register 212 and thus the entry information that was in REG. 10 will be in the MRU entry at REG. 0.

If a snoop/compare operation is performed and results in a "hit," it will be followed by an address invalidation operation. When an address invalidation operation occurs to invalidate an entry in the ACAM 104, an invalid entry flag is set to indicate that the current entry address is invalid. Also, the LRU stack control logic 114 inhibits placing of the invalidated entry information into the MRU entry register of the first stack register 212 and shifting of the stack first register stack 212. The invalidated entry address will be written, via the RTZ T/C entry buses 220 and 218, to the register I/O multiplexer 242 and the LRU output multiplexer 216 will direct output from the second register stack 210 to the LRU entry output. Subsequently, when new information is written to the cache, the LRU entry output will direct that the new entry information be written to the entry indicated by the LRU entry output. By this method, new information that is placed into the cache is written into entries that have been invalidated before entries that hold valid data.

When new information is written into the cache, the stack control logic 114 interprets the address write operation as a "hit" in the ACAM 104 and the corresponding entry address to which the new information is given by the current LRU entry output. When new information is written into the cache, it is directed to the cache entry that corresponds to the current LRU entry output by the cache memory controller while the cache responds to the associated address write operation in a way that is similar to a "hit" during an address compare operation. As a result, the new entry address produced by the address write operation also corresponds to the current LRU entry output and is conveyed by the dual dynamic T/C entry address buses to the first register stack 212. The stack control logic 114 then performs a compare and shift sequence on the first register stack 212. Accordingly, if the LRU entry output is outputting an invalidated address from the second register stack 210 when the associated address write operation occurs, it is taken that the new information is written to the invalidated address and the invalidated address counter 206 is decremented while the shift operation performed in the first register stack 212 has served to eliminate the invalid entry address bubble in the first register stack 212. If the invalidated address counter 206 decrements back to its initial state, then the counter control logic 114 switches the LRU output multiplexer 216 to output from the first register stack 212. In this way, invalidated entry addresses are used for storing new information before entries which contain valid entry addresses. For example, if the second register stack 210 contains an address corresponding to the contents of REG. 10 of the first register stack 212, then a new system address and associated data will be written to the entry corresponding to the entry address contained in the second register stack 210 and REG. 10 of the first register stack 212. When the new system address is written to the ACAM 104, the entry address is sent to the first register stack 212. The entry address is written into the second MRU register 214 and REG. 0 of the first register stack 212 while at the same time is compared to the contents of REG. 1 thorough REG. 31. Because this entry address matches the contents of REG. 10, the contents of REG. 0 through REG. 9 are shifted to REG. 1 through REG. 10 which eliminates the "bubble" in the first register stack 212. At the same time the counter control logic 204 decrements the invalidated entry address counter 206. If the second register stack 210 included only one invalid entry, then the invalidated entry address counter 206 would be back to its initial count value which can be decoded by the counter control logic 204 to reset the invalid entry address flag. Under this circumstance, the control signal 234, or flag, would be reset, thereby causing LRU output multiplexer 216 to direct LRU entry outputs from the first register stack 212.

Also, whenever an entry address is invalidated, the LRU stack control logic 114 generates an invalid entry address status signal 228 that is fed into the counter control 204. The counter control 204 generates an increment signal 232 each time an entry in the first register stack 212 is invalidated. The invalidated entry address counter 206 is typically initialized to a value of zero and incremented for each invalidation operation by the counter control 204. When the counter value is greater than zero, the counter control 204 will generate a control signal 234 that controls the output of the LRU output multiplexer 216. The control signal 234 is active whenever the counter value is greater than zero thereby indicating that the second register stack 210 includes invalidated entry information in its registers. When control signal 234 is active, LRU output multiplexer 216 outputs invalidated entry address information that is in second register 210 via register I/O multiplexer 242. The register I/O multiplexer 242 selects an output from one of the N registers in the second register stack 210, its output is determined by decoder 208 and the invalidated entry address counter 206. Each time new data is stored in a cache entry which is a currently invalidated entry, the counter control 204 generates a decrement signal 232 that decrements the invalidated entry address counter 206. In this manner, the invalidated entry address counter 206 increments from a value of zero based on the placing of invalidated entry address information and decrements based on the writing of new data to an invalidated entry address.

Figure 12:
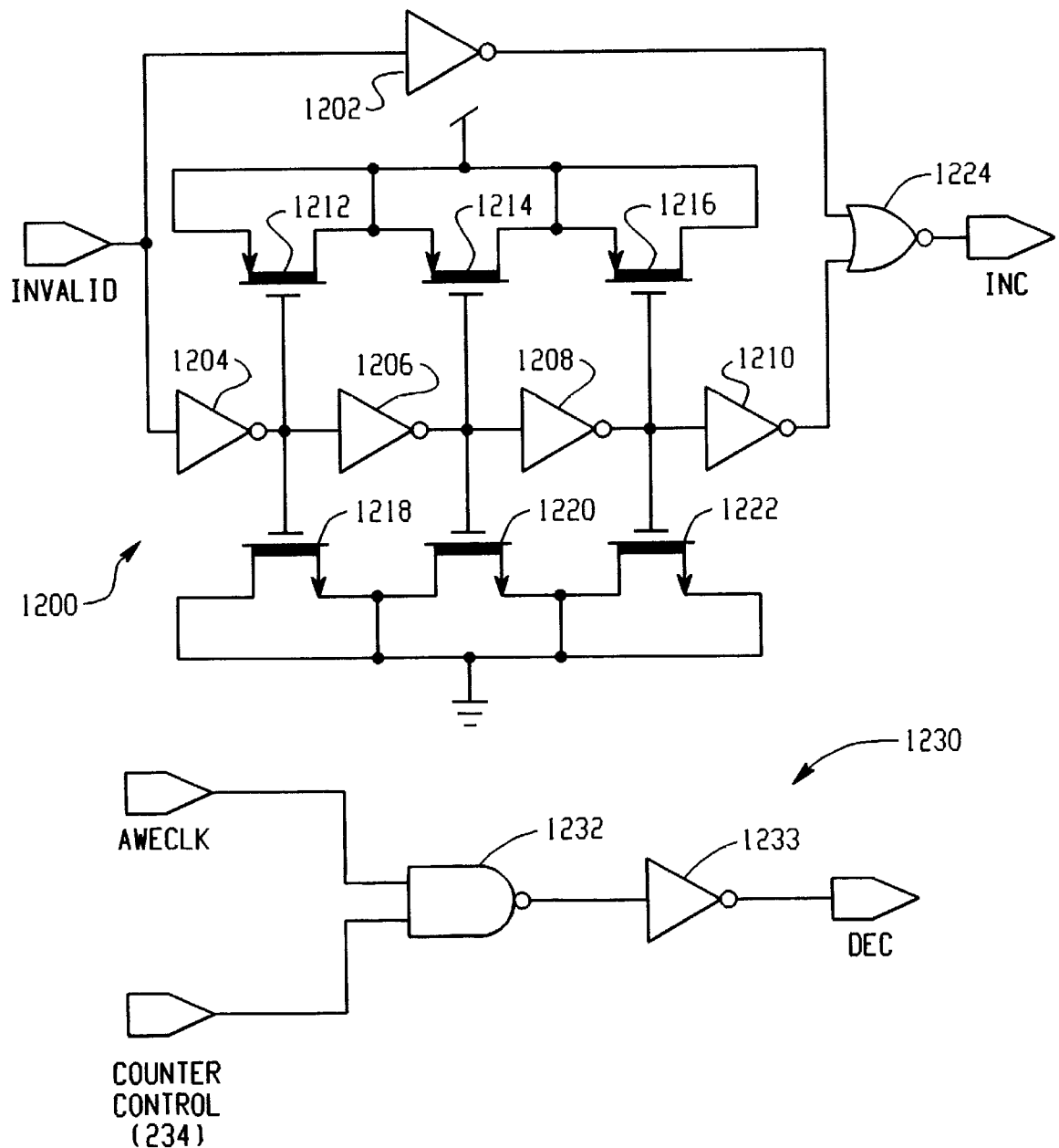
FIG. 12 is a circuit diagram showing increment and decrement control circuits of the present invention.

Illustrated in FIG. 12 is an increment control circuit 1200 and a decrement control circuit 1230 which are employed in the counter control circuit of 204. Increment control circuit 1200 includes inverter gates 1202–1210, PFET devices 1212–1216, NFET devices 1218–1222, and NOR gate 1224. The increment control circuit 1200 also includes an input INVALID and an output INC. A rising edge on input INVALID will cause a one shot logic HI pulse to appear at the output INC. Inverter gates 1204–1210, PFET devices 1212–1216 and NFET devices 1218–1222 function to add circuit delay and thereby determine the width of the pulsed output. The decrement control circuit 1230 includes NAND gate 1232 and inverter gate 1233. Input AWECLK enables NAND gate 1232 with every clock pulse and if, when NAND gate 1232 is enabled, input COUNTER COUNTROL goes HI, the output DEC will be HI for as long as both AWECLK and COUNTER COUNTROL are both HI.

The invalidated entry address counter 206 count value is fed back into the counter control 204 via counter output bus 236. As long as the invalidated entry address counter 206 counter value is greater than zero, counter control 204 will maintain the control signal 234 active so that the LRU output multiplexer 216 continues to output, as LRU entry information, invalidated entry addresses from the second register stack 210. When the invalidated entry address counter 206 count value is equal to zero, the counter control 204 will inactivate the control signal 234 thereby indicating that the second register stack 210 does not contain any invalidated entry addresses. The LRU output multiplexer 216 will then output entry information from the LRU entry register of the first register stack 212.

Referring now to FIG. 3A, a circuit diagram illustrating an entry address encoder circuit 300 for discharging a dual dynamic true/compliment (T/C) address buses is shown. The circuit includes NFET pull-down devices 304–312 which discharge the appropriate entry bus line as a function of wordline selected and hardware programming of the drain connections of devices 304–312. For example, the circuit 300 shows the encode programmed for wordline #3. NFET pull-down devices 304 through 308 have their gate terminals connected to wordline #3 input 302 and their source terminals connected to ground. Furthermore, NFET pull-down devices 304 through 308 have their drain terminals connected to entry address true bus lines EA4T, EA3T and EA2T. NFET pull-down devices 310 and 312 also have their terminals connected to wordline #3 input 302 and their source terminals connected to ground. However, NFET pull-down devices 310 and 312 have their drain terminals connected to entry address complementary bus lines EA1C and EA0C. Therefore, when wordline #3 input 302 is active, NFET pull-down devices 304 through 308 will discharge entry address true bus lines EA4T, EA3T and EA2T while NFET pull-down devices 310 and 312 will discharge entry address complementary bus lines EA1C and EA0C. Each wordline of the 32 wordline bus are input into a unique dual dynamic T/C entry address encoder in circuit communication with a discharge circuit similar to the circuit 300, however, programmed for the particular wordline selected. For example, it will be apparent to one having ordinary skill in the art that the discharge circuit for wordline #1 would have the drain terminals of NFET pull-down devices 304 through 310 connected to the entry address true bus lines EA4T–EA1T. In particular, NFET pull-down device 310 would have its drain terminal connected to entry address true bus line EA1T, while NFET pull-down devices 304 through 308 and 312 would be connected as presently shown in FIG. 3. A primary advantage of the circuit 300 with a pre-charged complementary dynamic bus is that it has the ability to provide a constant wordline load independent of the entry programming without including extra load devices.

Illustrated in FIG. 3B is the circuit of entry address encoder 123 with individual address bit inputs. The entry address encoder 123 includes a plurality of NFET devices 320–338. Each NFET device has its gate terminal connected to bus lines IN4T–IN0C which are included in dual dynamic entry address bus 121 from ACAM 104 and therefore form individual bit inputs into the entry address encoder 123. NFET devices 320–338 also have their drain terminals connected to dual dynamic complementary address bus lines EA4C–EA0T (shown as bus 125 in FIG. 1). In operation, when an address write is initiated in the ACAM 104, the ACAM 104 will place a 5 bit true and compliment entry address onto bus lines IN4T–IN0C. The entry address encoder 123 will then discharge the appropriate dual dynamic complementary address bus lines EA4C–EA0T via NFET devices 320–338 as appropriate.

Referring now to FIGS. 4A and 4B, circuit diagrams of alternative embodiments of a return to zero (RTZ) true/compliment (T/C) self-timed, inverting circuits 400A and 400B are shown. Referring now to FIG. 4A in particular, the RTZ T/C entry addresses lines can be automatically reset as a function of the pre-charge of the dual dynamic T/C entry address buses 218 and 220 (shown in FIG. 1). The circuit 400A is shown as an inverting driver circuit for a true or complement single address bit. The circuit 400A includes NFET device 404A and PFET device 402A. The PFET device 402A has its gate terminal connected to a bus line ENTADTC of dual dynamic T/C entry bus 116 and NFET device 404A has its gate terminal connected to a RESET line. A discharge of the pre-charged address bus line ENTADTC is inverted at output CMPAD through PFET device 402A in a self-timed transition. The output CMPAD is reset when the RESET line connected to the gate terminal of NFET device 404A is asserted high. As shown, the RESET signal can be a function of the pre-charged address bus line ENTADTC via the shown shunt connection 406A. In such a case, reset of the output CMPAD is performed in a self-timed manner with the entry address bus restore.

Referring now to FIG. 4B, an alternative embodiment of the self-timed inverting driver circuit is shown. The circuit 400B of FIG. 4B is a high gain feedback latch with an enable input at CMPADENN, a bit input at ENTADTC, and an output at CMPAD. The circuit 400B includes PFET devices 402B, 404B, 406B and 408B and includes NFET devices 410B, 412B, 414B and 416B. The circuit 400B further includes inverters 418B and 420B. The gate terminals of PFET devices 402B and 408B and NFET devices 414B and 412B are connected to the enable/reset signal CMPADENN. The gate terminal of PFET device 404B and NFET device 410B are connected to a bus line ENTADTC of dual dynamic T/C entry address bus 116. The inverter 418B has its input connected to the source terminals of PFET devices 404B and 408B and NFET devices 414B, 412B and 410B. The output of inverter 418B is connected to the input of inverter 420B and the gate terminals of PFET device 406B and NFET device 416B. The input node of inverter 418B has been labeled as A, and the output node of inverter 418B has been labeled as B. The output of inverter 420B is the output CMPAD of the self-timed inverting driver circuit 400B.

The circuit 400B of FIG. 4B permits self-timed activation off of a discharge of an entry bus line, but also allows resetting of the output CMPAD that is independent of the dual dynamic T/C entry address bus 116. The circuit also provides higher drive capability. This provides faster cycle times by permitting the output CMPAD to be reset before or during a reset of the dual dynamic T/C entry address bus 116, instead of after it. The bus line ENTADTC is normally a pre-charged line and the circuit 400B is enabled when input CMPADENN is low. Therefore, when ENTADTC begins to discharge, PFET device 404B will turn on and will pull up node A to a logic high level. As the level on node A rises, inverter 418B will drive its output at node B to logic low. A low input at node B will cause inverter 420B to drive its output CMPAD to logic high. However, when CMPADENN is driven high, NFET device 414B will drive node A to a logic low level and thereby cause node B at the output of inverter 418B to rise to a logic high level. Accordingly, the output of inverter 420B CMPAD will be driven to a logic low level. In this manner, the circuit 400B of FIG. 4B is reset.

Referring now to FIG. 5, a circuit diagram illustrating a stack feedback circuit 524 is shown. The stack feedback circuit 524 is employed as a mirror of a compare operation performed in the first register stack 212 (shown in FIG. 2). The feedback circuit 524 can be used to enable the shift operation in the first register stack 212 and reset of the self-time inverting circuits of FIGS. 4A and 4B upon the completion of a compare operation in the first register stack 212. The circuit 524 includes a plurality of inverter gates 504–516, NEFET devices 518 and 520, PFET devices 522 and 526 and NOR gate 502. The stack feedback circuit 524 has as inputs MATRES, true (T) and compliment (C) signals, and an outputs STKFB and LRUTCFB. The stack feedback signal STKFB is used to gauge the progress of the stack compare operation and also to determine how soon the RTZ T/C entry address buses 220 and 218 can be reset. The stack feedback circuit 524 input signals T and C can be the true and compliment bit address bus lines arriving at the opposite end of the first register stack 212 (shown in FIG. 2) from which they are driven, or they may be the true and compliment address bit lines from any other point along the first register stack 212. When MATRES is discharged, PFET device 526 will be turned on and cause the voltage level at node A5 to rise. Inverter gates 510 and 512 will cause the output STKFB to rise as node A5 rises. After the STKFB is pre-charged HI, the stack feedback circuit 524 is enabled, and a high going input at T or C will cause NFET device 520 to turn on and cause node A5 to be pulled down to a logic low level. When node A5 is pulled to a logic low level, inverter gates 510 and 512 cause the output STKFB to be also pulled down to a logic low level. In this manner, the circuit delay caused by the stack feedback circuit 524 from its T and C inputs to its STKFB output can be configured to mirror the compare operation occurring at the opposite end of the first register stack 212 (shown in FIG. 2) and thereby determine how soon a register shift operation can begin and the RTZ T/C entry address buses 220 and 218 can be reset. The LRUTCFB output signal provides an indication of the true and complement bit entry status in the first register stack 212.

Referring now to FIGS. 6 and 7, a circuit diagram illustrating a memory circuit for storing a bit of entry address information in the first register stack 212 is shown in FIG. 6 and a block diagram illustrating the overall stack architecture of the first register stack 212 is shown in FIG. 7. Referring now to FIG. 6 in particular, each bit of each stack register is composed of dual D-type latches in a master-slave arrangement and a comparator. A first latch 646 includes NFET devices 600–603, and inverter gates 616–622. The first latch 646 has as inputs IN1, $\overline{IN1}$ and FIRST CLOCK, and as outputs OUT1, $\overline{OUT1}$. A second latch 648 has NFET devices 604–607, and inverter gates 624–640. The second latch 648 has as inputs IN2, $\overline{IN2}$ and 2ND CLOCK and as outputs OUT2, $\overline{OUT2}$. The outputs OUT1 and $\overline{OUT1}$ of first latch 646 are connected to the inputs IN2 and $\overline{IN2}$ of second latch 648. The outputs OUT2 and $\overline{OUT2}$ are connected to the input of comparator 644. Comparator 644 has NFET devices 610, 612 and 615, and PFET devices 611, 613 and 614. Further included in the circuit of FIG. 6 are NFET devices 608 and 609. The NFET devices 608 and 609 have their gate terminals connected to RESET HIGH and RESET LOW signals and are used to set all of the second latches to a programmed state at power up or after a flush operation.

Since first latch 646 and second latch 648 are clocked D-type latches, input signals present at IN1 and $\overline{IN1}$ and IN2 and $\overline{IN2}$ will be present at OUT1 and $\overline{OUT1}$ and OUT2 and $\overline{OUT2}$ when the FIRST CLOCK and 2ND CLOCK signals are asserted to each latch. The comparator 646 compares the state of the outputs OUT2 and $\overline{OUT2}$ of the second latch 648 to an assigned bit on the RTZ T/C entry address buses 218 and 220 (shown as RTZ TRUE ENTRY BIT and RTZ COMP ENTRY BIT). The comparator 644 output MATCH is pre-charged HI and will be driven logic LOW any time OUT2 and $\overline{OUT2}$ do not match the active states of RTZ TRUE ENTRY BIT and RTZ COMP ENTRY BIT. The MATCH RESTORE input turns on PFET device 614 and pre-charges the MATCH output to a logic HI and can be shared by all common comparators in communication with the same match line.

Referring now to FIG. 7, a block diagram illustrating certain components of the first register stack 212 architecture is shown. Bit registers 700–710 are block diagrams of the circuit of FIG. 6. The first latch inputs IN1 T&C are connected to the outputs OUT2 T&C of the preceding register in the stack. For example, IN1 T&C of bit register 702 is connected to the output OUT2 T&C of bit register 700. The MATCH of each bit register is connected to a multi-input NOR structure that gates a second clock such that the second latches of each bit register 700, 704, 708 and 702, 706 and 710, are updated by the second clock when any bit register's own MATCH LINE or the MATCH LINE of any less recent register signifies a positive match condition. For example, bit registers 700, 704 and 708 each have their MATCH output connected to a NOR structure that includes NOR gates 712 and 714 and an inverter 716. Accordingly, when the MATCH output of each bit register 700–708 remains HI, thereby indicating a matching condition, NOR gate 712 drives its output logic LOW and enables NOR gate 714 to drive its output HI when 2ND CLOCK is driven HI. When the MATCH output of bit registers 700–708 indicate a no MATCH condition, and all other inputs to NOR gate 712 also indicate a no MATCH condition, the output of NOR gate 712 will be HI thereby disabling NOR gate 714. The output of NOR gate 714 will be driven LOW. In this manner, the multi-input NOR structure gates a second clock such that the second latches of bit registers 700–708 will be updated by the second clock when its own MATCH LINE or the MATCH LINE of any less recent five-bit register indicates positive match condition.

Illustrated in FIG. 8A is a circuit diagram showing a second clock generation circuit 800. The second clock generation circuit 800 employs the stack feedback signal of the stack feedback circuit of FIG. 5, a multi-input NOR structure to provide loading on the feedback signal that matches register loading and a tracking signal delay that is used to mirror the progress of the register compare operation to delay the generation of the second clock signal until after the worst case multi-input NOR has settled in the first register stack 212. The second clock generation circuit 800 includes a 32-input NOR gate 802 and inverter gates 804 and 806. When the stack feedback signal of the first register stack 212 is driven LOW, thereby indicating that each register has received entry address on the RTZ T/C entry address buses 220 and 218 (shown in FIG. 2), NOR gate 802 will drive its output HI, causing inverter gate 806 to drives its output HI. Accordingly, the 2ND CLOCK output of second clock generation circuit 800 will be asserted after each register in the 32-register stack (i.e. first register stack 212) has received the entry address on RTZ T/C entry address buses 220 and 218 and performed a compare operation, and a compare operation for the worst case register is completed. The feedback signal is designed to simulate the slowest MATCH LINE signal in the first register stack to thereby guarantee that this worst case scenario is satisfied. A worst case register is last register in the stack to perform the compare operation. Illustrated in FIG. 8B is essentially the same circuit of FIG. 8A, except that a SNOOPN input has been added with an inverter 808. The circuit also functions in the same manner as the circuit of FIG. 8A except that it takes into account the performance of a snoop function and is shown as an alternative to the circuit of FIG. 8A.

Figure 9:
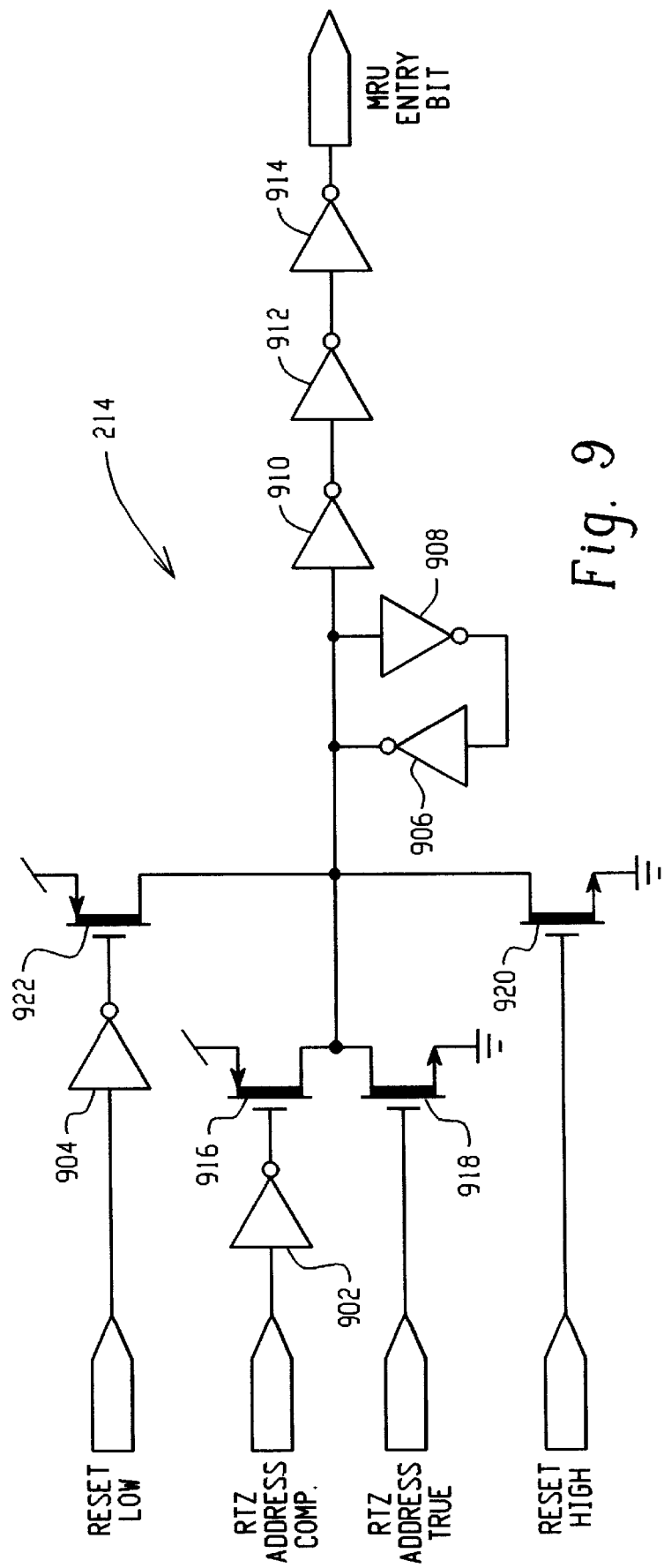
FIG. 9 is a circuit diagram of a second MRU register circuit shown for a single bit of an address.

Illustrated in FIG. 9 is a circuit diagram of a second MRU register 214 for a single bit of a five-bit register entry address. The second MRU register 214 includes inverter gates 902–914 and PFET devices 916 and 922 and NFET devices 918 and 920. The second MRU register 214 is configured to comprise a single RS flip-flop. The second MRU register 214 includes as inputs an RTZ compliment address bit (RTZ Address Comp), a RTZ true address bit (RTZ Address True) and Reset Low and Reset High inputs. The Reset Low and Reset High inputs function to reset the second MRU register 214 output MRU Entry Bit to either a logic LOW or a logic H level. The second MRU register 214 automatically updates upon the generation of the RTZ T/C entry addresses on buses 218 and 220 (shown in FIG. 2), and provides an updated MRU entry faster than the MRU register in the first register stack 212 (also shown in FIG. 2) since it does not have to wait until the generation of a second clock signal to update. The second MRU register will also update for a snoop compare operation.

Figure 10A:
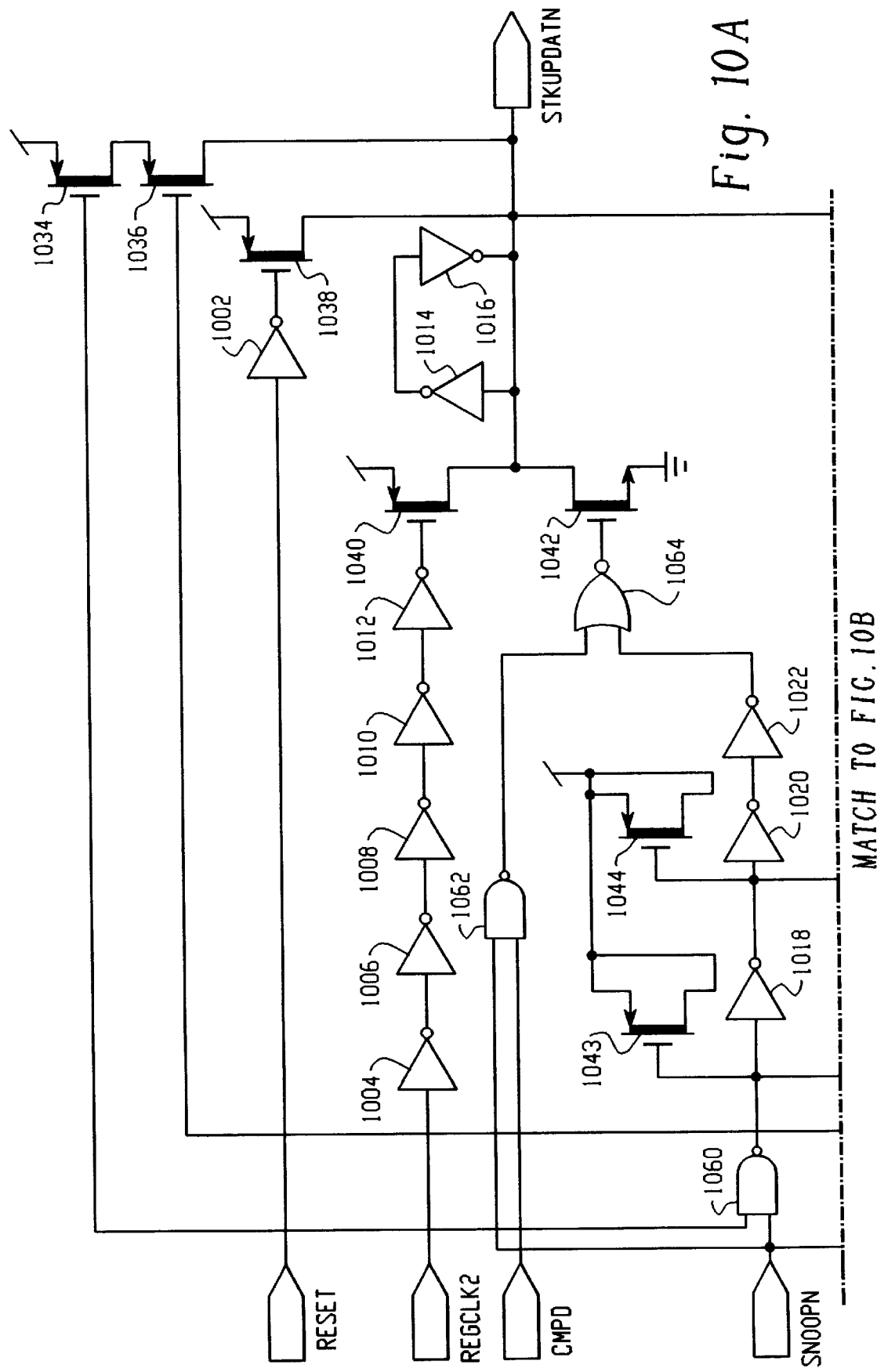
FIGS. 10A and 10B are circuit diagrams illustrating a LRU stack update circuit that includes logic for inhibiting LRU stack updates during a snoop cycle.
Figure 10B:
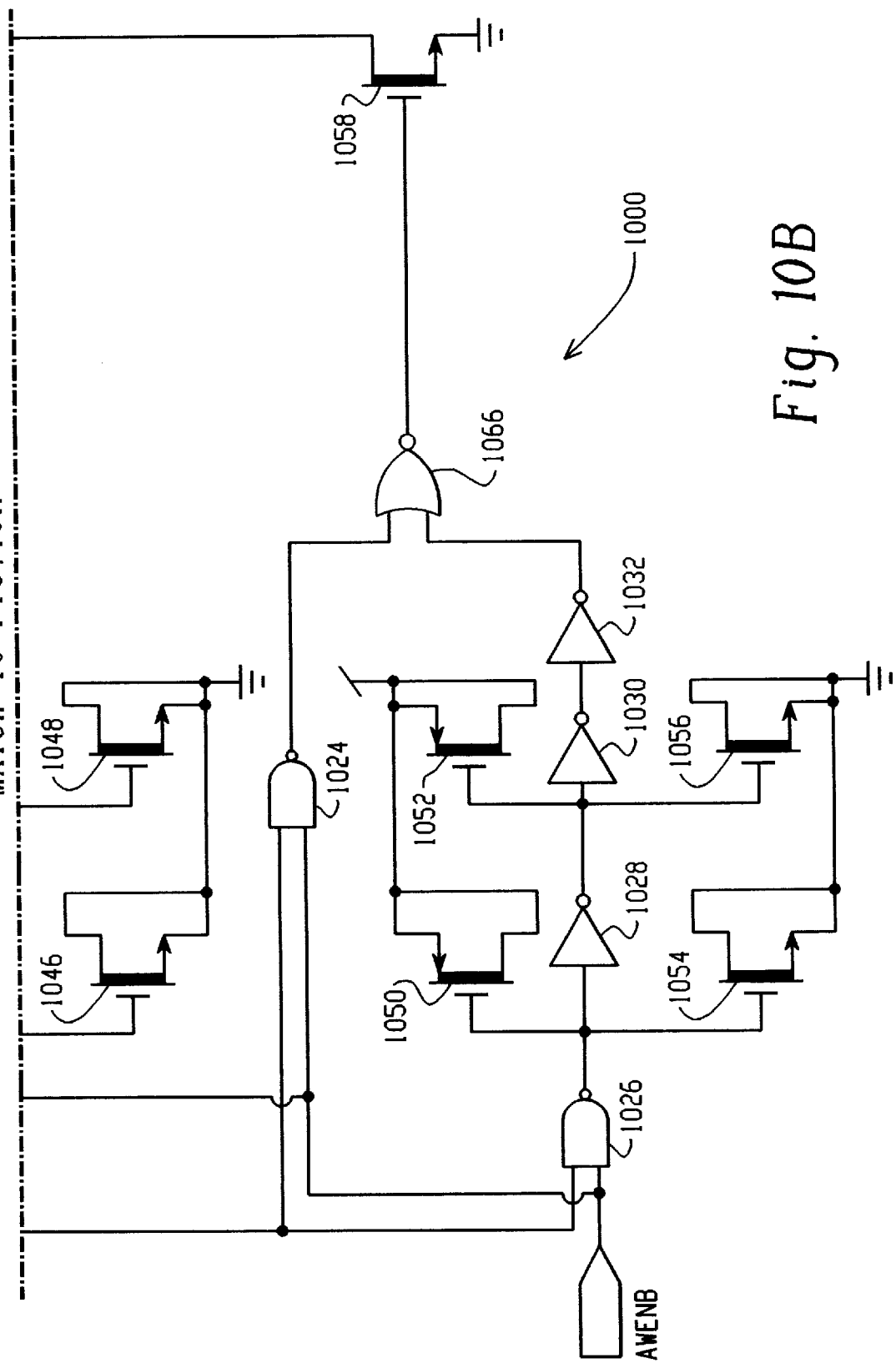

Referring now to FIGS. 10A and 10B, a circuit diagram illustrates a LRU stack update circuit 1000 which includes logic for inhibiting LRU stack updates during a snoop cycle. As part of normal operation, the first register stack 212 will update its registers for compare and address write operations. Moreover, during a snoop address compare operation, the cache memory's data output is disabled. The circuit 1000 is located within the stack control logic 114 and has a compare input (CMPD), a snoop status input (SNOOPN), an address write enable input (AWENB), a reset input (RESET) and a clock input (REGCLK2). The circuit 1000 includes inverter gates 1002–1024 and 1028–1032, PFET devices 1034–1040, 1043, 1044, 1050 and 1052, NFET devices 1042, 1046, 1048, 1054–1058, NAND gates 1024, 1026, 1060, and 1062, NOR gates 1064 and 1066. The circuit 1000 generates a STKUPDATN output when either an address write operation is initiated in the cache memory or when an address compare operation is being performed. It inhibits an output, however, if the SNOOPN input indicates that these operations occur during a snoop cycle.

The output STKUPDATN is activated by a one-shot pulse initiated from an input transition (in this case, a rising edge of CMPD). The input transition is propagated down two different legs into the NOR gate 1064 when SNOOPN is HI. In particular, the first leg includes NAND gate 1062 and the second leg includes NAND gate 1060 and inverters 1018–1022. The difference between the propagation times in these two legs determines the width of the one-shot pulse output which activates STKUPDATN. Similarly, a rising edge on input AWENB while SNOOPN is HI will cause a one-shot pulse output to activate output STKUPDATN. The PFET and NFET devices 1043–1056 function to further retard circuit delay through inverters 1018–1022 and 1028–1032 and thereby increase the pulse width. Therefore, the circuit of 1000 will activate output STKUPDATN by driving it LOW when a rising edge is detected on either the AWENB or the CMPD inputs and thereby directing the stack control logic 114 to update of the first register stack 212. The output STKUPDATN is reset by the second register clock.

Figure 10C:
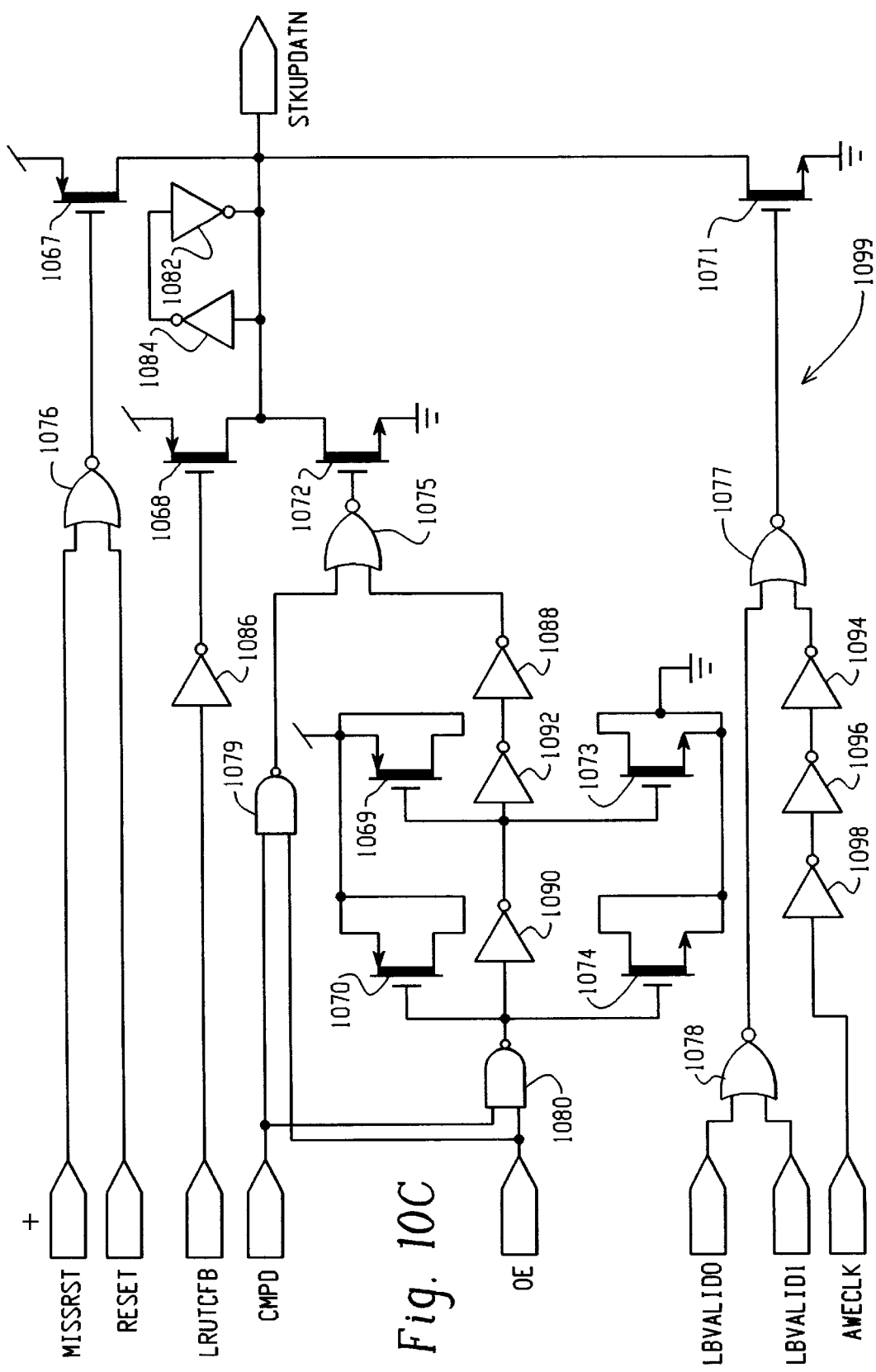
FIG. 10C is a circuit diagram illustrating an alternative embodiment to the circuit of FIGS. 10A and 10B.

Illustrated in FIG. 10C is an alternative embodiment to the circuit of FIGS. 10A and 10B. In particular, a circuit 1099 is shown in FIG. 10C that includes logic for inhibiting an update of the first register stack 212 (shown in FIGS. 2A and 2B) based on the execution of compare operation and the status of the output enable OE input and the execution of an address write operation and the status of the system address valid bits. The circuit 1099 includes inverter gates 1082–1098, NAND gates 1079 and 1080, NOR gates 1075–1078, NFET devices 1071–1074 and PFET devices 1067–1070. The circuit 1099 further includes inputs reset miss MISSRST, reset RESET, LRU true and complement feedback LRUTCFB, compare CMPD, output enable OE, valid bit status LBVALID0 and LBVALID1, and an address write enable clock AWECLK and an output STKUPDATN. The output STKUPDATN is reset to a logic H level through NOR gate 1076 and PFET device 1067 any time either MISSRST or RESET are HI. The output STKUPDATN is also reset any time input LRUTCFB is HI through inverter gate 1086 and PFET device 1068.

The output STKUPDATN can be asserted LOW under two scenarios be the circuit 1099. The first scenario is similar to the operation of the circuit of FIGS. 10A and 10B wherein the output STKUPDATN is activated by a one-shot pulse initiated from an input transition, in this case, a rising edge of CMPD, while the output enable OE input signal is HI. The output enable OE signal is generated by the cache controller. When a snoop compare operation is performed in the cache, OE is used to inhibit the cache's data outputs since no data is looked for in a snoop compare operation. It will also block the CMPD signal from generating a pulse to activate the STKUPDATN signal. The input transition is propagated down two different legs into the NOR gate 1075. The first leg including NAND gate 1079 and the second leg including NAND gate 1080, inverter gates 1088–1092, PFET devices 1069 and 1070, and NFET devices 1073 and 1074. The output of NOR gate 1075 inputs the one shot pulse to NFET device 1072 which will drive output STKUPDATN to a LOW state. The difference between the propagation times in these two legs determines the width of the one-shot pulse output which activates STKUPDATN. In the second scenario, a rising edge on input AWECLK while either valid bit status inputs LBVALID0 and LBVALID1 are HI will generate a one-shot pulse output from NOR gate 1077 to NFET device 1071. The pulse width is determined be the pulse width of the AWECLK signal. Accordingly, the circuit of 1099 will activate output STKUPDATN by driving it LOW when a rising edge is detected on either the CMPD or the AWECLK inputs and thereby directing the stack control logic 114 to update the first register stack 212. Therefore, updating of the first register stack will be inhibited while the output enable OE input signal is LOW, or while both valid bit status inputs LBVALID0 and LBVALID1 are LOW.

Figure 11A:
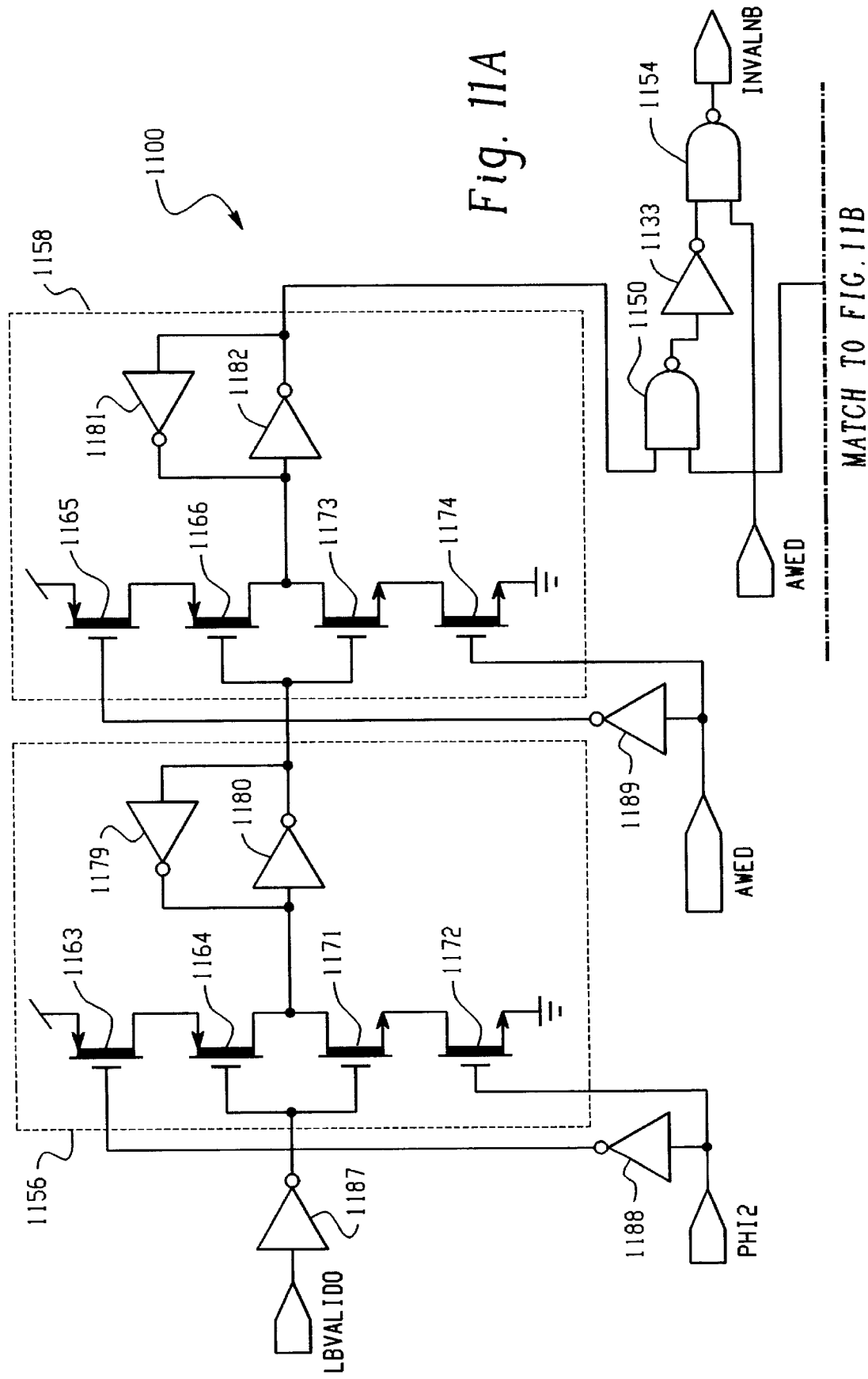
FIGS. 11A and 11B are circuit diagrams illustrating a circuit for generating an invalid entry status or flag signal.
Figure 11B:
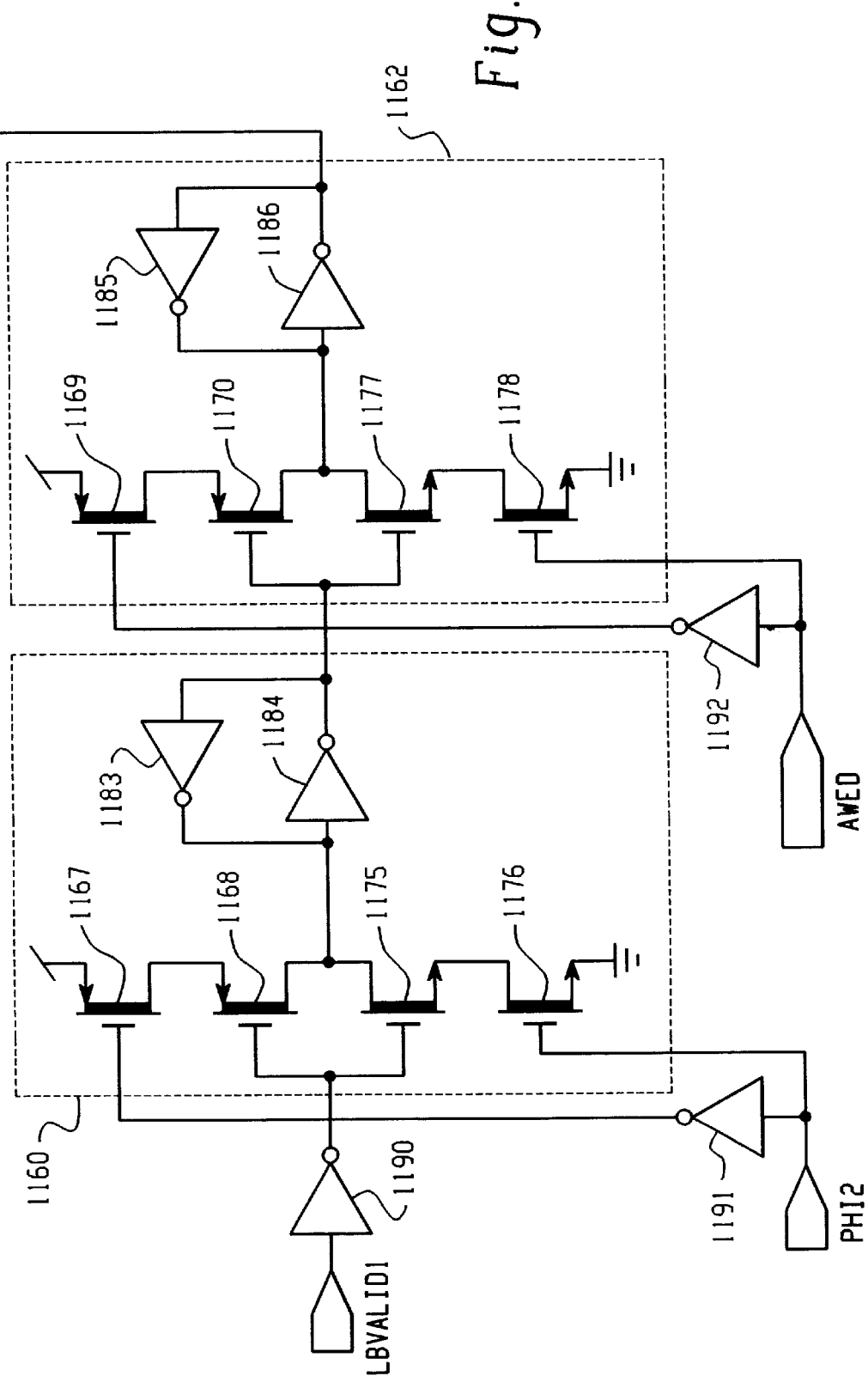

Referring now to FIGS. 11A and 11B, a circuit diagrams illustrating a circuit 1000 for generating an invalid entry status or flag signal is shown. The circuit 1100 is located within the stack control logic 114 and includes dual enabled inverter circuits 1156–1162, NAND gates 1150–1154 and inverter gate 1133. Dual enabled inverter circuit 1156 includes inverter gates 1179 and 1180, PFET devices 1163 and 1164 and NFET devices 1171 and 1172. The dual enabled inverter circuits 1158–1162 are identical in construction to the dual enabled inverter circuit 1156. Dual enables circuit 1156 has an LBVALID0 and a PHI2 input through inverter gates 1187 and 1188.

In operation, the circuit 1100 employs valid bit information during an address write cycle to identify an address invalidate operation and to inhibit updating of the first register stack 212 (shown in FIG. 2). In particular, when enable signals PHI2 and AWED are asserted, valid status bits LBVALID0 and LBVALID1 are compared. Under such conditions, when LBVALID0 and LBVALID1 are logic level HI, INVALNB will be driven LOW. This will inhibit the first register stack 212 from inputting invalidated entries into the MRU entry register REG. 0. The INVALNB output is input into the counter control 204 of FIG. 2B and serves as a flag to indicate that the second register stack includes invalidated entry address information. The INVALNB signal will direct the register I/O multiplexer 242 to input entry address information from the RTZ T/C entry address buses 220 and 218 into the second register stack 210.

Figure 11C:
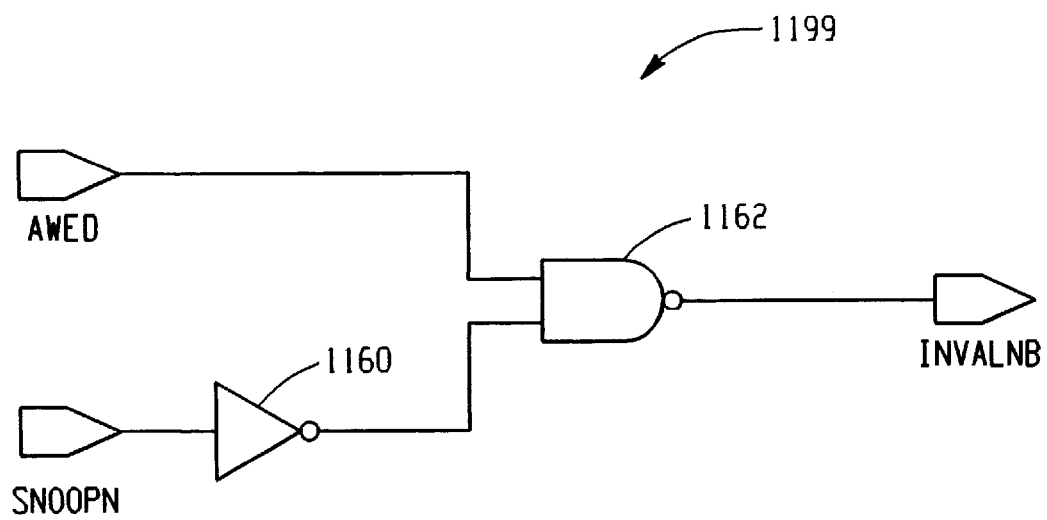
FIG. 11C is an alternative embodiment to the circuit of FIGS. 11A and 11B illustrating a circuit for generating an invalid entry status or flag signal.

Shown in FIG. 11C is an alternative embodiment to a portion of the circuit of FIGS. 11A and 11B that determines an address invalidation cycle based on address write (AWED) and valid bit inputs (LBVALID0 and LBVALID1). The circuit 1199 of FIG. 11C determines whether an address invalidation cycle is being executed based on an address write enable AWED input and a snoop input SNOOPN. The circuit includes inverter gate 1160 and NAND gate 1162. The output INVALNB is active LOW when the AWED input is HI and the SNOOPN input is LOW to thereby indicate that an address write operation in the cache is occurring during the same time a snoop operation is occurring in the cache.

While the present invention has been illustrated by the description of embodiments thereof, and while the embodiments have been described in considerable detail, it is not the intention of application to restrict or in any way limit the scope of the appended claims to such detail. Additional advantages and modifications will readily appear to those skilled in the art. For example, the second register stack may include any number of registers for holding invalidated entry addresses or the first register stack may be larger or smaller than 32 registers. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method of executing a Least Recently Used replacement mechanism in a computer, wherein the computer comprises an address content addressable memory and a register stack comprising at least an N most recently used entry register, an N+1 next most recently used entry register and an N+Z least recently used entry register, wherein in N is any integer equal to or greater than 0, and Z is any integer equal to or greater than 2, wherein each register comprises a content that includes a binary number capable of representing an entry address, the method comprising the steps of:

(a) determining if a cache memory access operation in the address content addressable memory is being performed;

(b) generating a new entry address, if the cache memory access operation indicates a positive match in the address content addressable memory;

(c) transmitting the new entry address to a plurality of entry address comparators in the register stack;

(d) comparing the new entry address to entry addresses stored to in each register of the register stack except the Nth register;

(e) identifying an N+M register in the register stack that comprises the entry address; M being in the range of 1 to Z; and (f) shifting the contents of registers N through N+M−1 to registers N+1 through N+M while shifting the new entry address into the Nth register.

2. The method of claim 1 wherein the step of determining if a cache memory access operation in the address content addressable memory is being performed includes the step of determining if a compare operation is being performed in the address content addressable memory.

3. The method of claim 1 wherein the step of determining if a cache memory access operation in the address content addressable memory is being performed includes the step of determining if an address write operation is being performed in the address content addressable memory.

4. In a multi-way cache memory system having an address content addressable memory, a dynamic entry address bus, a LPU register stack, stack control logic and wherein the first register stack includes at least an N and an N+1 next entry register for storing entry addresses wherein N is any integer equal to or greater than zero and wherein the N and the N+1 next entry registers comprise entry addresses, a method of handling invalidated entry or way addresses in a register stack used to implement a Least Recently Used replacement algorithm for a multi-way cache memory comprising the step of inhibiting an update of the LRU register stack during a snoop compare operation caused by a snoop cycle, wherein the step comprises the steps of:

(a) sensing a cache memory access operation in the address content addressable memory;

(b) sensing a snoop cycle in the address content addressable memory; and (c) generating an inhibit signal responsive to the cache memory operation being executed in the address content addressable memory and the snoop cycle being executed in the address content addressable memory, wherein said generating step comprises the steps of:

(1) sensing an address compare operation in the address content addressable memory or (2) sensing an address write operation in the address content addressable memory.

5. The method of claim 4 wherein the step of generating an inhibit signal further comprises the step of sensing an address write enable signal to determine whether an entry address invalidation operation is initiated.

6. In a multi-way cache memory system having an address content addressable memory, a dynamic entry address bus, a first register stack, a second register stack, stack control logic, a counter, a multiplexer in circuit communication with the first register stack and the second register stack and wherein the first register stack includes at least an N and an N+1 next entry register for storing entry addresses wherein N is any integer equal to or greater than zero and wherein the N and the N+1 next entry registers comprise entry addresses, and wherein the second register stack includes at least an M invalid entry register for storing invalidated entry addresses wherein M is any integer equal to or greater than zero, a method of handling invalidated entry or way addresses in a register stack used to implement a Least Recently Used replacement algorithm for a multi-way cache memory comprising the steps of:

(a) sensing an address invalidation operation in the stack control logic; wherein the step of sensing a snoop cycle in the stack control logic includes the steps of:

(1) sensing an address write operation; and (2) sensing a snoop cycle;

(b) outputting an entry address that corresponds to the system address on the dynamic entry address bus;

(c) outputting an invalid entry address signal from the stack control logic;

(d) directing the entry address through the multiplexer to the M register as a function of a value of said counter;

(e) recognizing that the second register stack includes at least one entry address; and (f) incrementing said counter to indicate number of entry addresses stored in the second register stack.

7. The method of claim 6 wherein the second register stack further includes at least an M+1 invalid entry register and wherein the method further comprises the step of shifting the contents of the M invalid entry register to the M+1 invalid entry register if the second register stack includes at least one entry address.

8. The method of claim 6 wherein the step of sensing said address invalidation operation further comprises the steps of:

(a) sensing said address write operation; and (b) sensing valid bit status information.

9. The method of claim 6 further comprising the step of inhibiting an update operation in first register stack.

10. the method of claim 6 further comprising the step of outputting an entry address from the second register.

11. The method of claim 6 further comprising the step of decrementing said counter upon utilizing said invalidated entry address for storing new entry address information.

12. In a multi-way cache memory system having an address content addressable memory, a dynamic entry address bus, a first register stack, a second register stack, stack control logic, a counter, a multiplexer in circuit communication with the first register stack and the second register stack and wherein the first register stack includes at least an N and an N+1 next entry register for storing entry addresses wherein N is any integer equal to or greater than zero and wherein the N and the N+1 next entry registers comprise entry addresses, and wherein the second register stack includes at least an M invalid entry register for storing invalidated entry addresses wherein M is any integer equal to or greater than zero, a method of handling invalidated entry or way addresses in a register stack used to implement a Least Recently Used replacement algorithm for a multi-way cache memory comprising the steps of:

(a) invalidating a system address stored in the address content addressable memory;

(b) outputting an invalidated entry address from the address content addressable memory to the dynamic entry address bus;

(c) inputting the invalidated entry address from the dynamic entry address bus to the M invalid entry register of the second register stack;

(d) setting a flag to indicate that the second register stack includes at least one entry address;

(e) incrementing said counter to indicate the number of entry addresses stored in the second register stack;

(f) shifting the address information in the N entry register to the N+1 next entry register in the first register stack; and (g) storing a subsequent entry address in the N entry register of the first register stack.

13. The method of claim 12 further comprising the step of outputting entry address information stored in the second register stack.

14. The method of claim 13 further comprising the step of decrementing the counter to indicate number of entry addresses stored in the second register stack.

15. The method of claim 12 wherein the step of invalidating said system address represented by the entry address stored in the N+1 next entry register of the first register stack by a snoop cycle comprises the steps of:

(a) sensing an address write operation in the address content addressable memory; and (b) sensing valid bit status information associated with the system address.

16. A Least Recently Used Replacement architecture for a cache memory comprising:

(a) an N-way addressable content addressable memory for maintaining correspondence between system addresses and way addresses;

(b) an N-way data array in circuit communication with the N-way addressable content addressable memory and for storing data;

(c) an N-entry register stack for storing entry addresses, wherein the N-entry register stack comprises at least a first register, an intermediate register and a last register, wherein each register comprises a plurality of bits, wherein the plurality of bits comprises a number of bits associated with a binary address of each entry stored in the addressable content addressable memory;

wherein in the intermediate and last register further comprise a comparator for comparing a new entry address to the stored entry address;

wherein the first register further comprises an address of a most recently used entry;

wherein the intermediate register further comprises an address of a next most recently used entry; and wherein the last register comprises an address of a least recently used entry;

(d) a second register for storing the address of the most recently used entry;

(e) a plurality of entry address encoders comprising N encoders, each encoder comprising:
(1) a first input in circuit communication with the data array and for receiving a way select signal from the data array;
(2) a second input in circuit communication with the addressable content addressable memory and for receiving a write way select signal from the addressable content addressable memory; and
(3) an output in circuit communication with an entry address bus and for outputting entry address information;

(f) register stack control logic for controlling the N-entry register stack and in circuit communication with the N-entry register stack;

(g) a wordline NOR circuit in circuit communication with the data array and for indicating whether the data array comprises a given datum of information, the wordline NOR circuit comprising a plurality of wordline inputs in circuit communication with a plurality of wordline outputs from the address content addressable memory;

(h) a register stack feedback circuit in circuit communication with the register stack control logic and N-entry register stack and for feeding back to the register stack control logic progress of a compare operation executed in the N-entry register stack;

(i) an entry address driver circuit in circuit communication with the entry address encoders and the N-entry register stack and for communicating the entry address encoders to the N-entry register stack; and (j) an entry address bus in circuit communication with the N-entry register stack and the entry address driver circuit and for transmitting return-to-zero entry address to the N-entry register stack.

17. The architecture of claim 16 wherein the each register further comprises a bit register having:
(a) a first latching circuit for storing a true and complement entry address bit;
(b) a second latching circuit in circuit communication with the first latch and for storing a true and complement entry address bit, wherein the second latching circuit comprises an input and an output; and
(c) a compare circuit for comparing the output of the second latching circuit to true and complement entry address on the entry address bus.

18. The architecture of claim 16 wherein the entry address driver circuit comprises:
(a) an entry address bit circuit for inputting an entry address;
(b) an output for outputting an entry address bit; and
(c) a self-timed reset circuit configured to reset the output as a function of the entry address bit circuit.

19. The architecture of claim 16 wherein the register stack feedback circuit comprises:
(a) a true and complement entry bit input circuit;
(b) a stack feedback output circuit; and
(c) a reset circuit in circuit communication with the stack feedback output circuit and comprising a plurality of inverter gates for generating a propagation delay.

20. A cache memory device for handling invalid entry or way data in a least recently used replacement algorithm, the cache memory device comprising:
(a) a first register stack for storing address information, the first register stack comprising at least a N and a N+1 next register wherein N is any integer greater than or equal to zero;
(b) a dynamic entry address encoder for encoding an entry address into true and complement entry addresses;
(c) a self-timed inverting dynamic entry address inverter driver circuit for generating a self-timed true entry address bus and a self-timed complement entry address bus;
(d) a dynamic entry address bus in circuit communication with the dynamic entry address encoder and the self-timed inverting dynamic entry address inverter circuit and for transmitting true and complement entry addresses;
(e) a self-timed first register stack feedback circuit in circuit communication with the self-timed inverting dynamic entry address inverter driver circuit and for measuring the progress of a first register stack compare operation;
(f) stack control logic in circuit communication with the self-timed first register stack feedback circuit, dynamic entry address encoder and the first register stack and for controlling the first register stack input and output;
(g) an MRU register in circuit communication with the stack control logic and self-timed inverting dynamic entry address inverter circuit and for storing a most recently used entry address;
(h) a second register stack for storing address information in circuit communication with the self-timed inverting dynamic entry address inverter circuit; and
(i) a counter control circuit in circuit communication with the stack control logic and a LRU multiplexer and for controlling the LRU multiplexer.

21. The cache memory device of claim 20 wherein the first register stack further comprises a bit register having:
(a) a first latching circuit for storing a true and complement entry address bit;
(b) a second latching circuit in circuit communication with the first latch and for storing a true and complement entry address bit, wherein the second latching circuit comprises an input and an output; and
(c) a compare circuit for comparing the output of the second latching circuit to true and complement entry address bit.

22. The cache memory device of claim 20 wherein the dynamic entry address encoder comprises a discharge circuit for discharging the dynamic entry address bus wherein the discharge circuit comprising a wordline input.

23. The cache memory device of claim 20 wherein the self-timed inverting dynamic entry address inverter driver circuit comprises:

(a) an entry address bit circuit for inputting an entry address;

(b) an output for outputting an entry address bit; and (c) a self-timed reset circuit configured to reset the output as a function of the stack feedback circuit.

24. The cache memory device of claim 20 wherein the a self-timed first register stack feedback circuit comprises:

(a) a true and complement entry bit input circuit;

(b) a stack feedback output circuit;

(c) a reset circuit in circuit communication with the stack feedback output circuit and comprising a plurality of inverter gates for generating a propagation delay.

25. The cache memory device of claim 20 wherein the stack control logic comprises:

(a) a stack update circuit for inhibiting an update operation of the first register stack, wherein the stack update circuit comprises:

(1) a compare entry address operation input circuit for sensing the status of a compare entry address status signal;

(2) a snoop operation input circuit for sensing the status of a snoop operation status signal;

(3) an address write enable input circuit for sensing the status of an address write signal; and (4) a stack update output for generating a stack update output signal; and (b) an address write operation input circuit for generating an invalid entry address status signal, wherein the invalid entry address status circuit comprises:

(1) a valid bit status input circuit for inputting the status of an entry address valid status bit; and (2) an invalid entry address status output circuit for generating an invalid entry address status signal.

26. The cache memory device of claim 20 wherein the MRU register comprises:

(a) a true entry address bit input circuit for receiving a true entry address bit;

(b) a complement entry address bit input circuit for receiving a complement entry address bit;

(c) an MRU entry bit output for outputting an MRU entry bit; and (d) a reset circuit for resetting the MRU entry bit output, wherein the reset circuit comprises:

(1) a reset low circuit for resetting the MRU entry bit to a logic low level; and (2) a reset high circuit for resetting the MRU entry bit to logic high level.

27. The cache memory device of claim 20 wherein the second register stack comprises at least an M register wherein M is any integer equal to or greater than zero and wherein the M register comprises a bit register circuit for storing an entry address bit, wherein the bit register circuit comprises an input and an output.

28. The cache memory device of claim 20 further comprising a counter circuit for counting number of entry addresses stored in the second register.

29. The cache memory device of claim 20 wherein the self-timed inverting dynamic entry address inverter driver circuit comprises:

(a) an entry address bit circuit for inputting an entry address;

(b) an output for outputting an entry address bit; and (c) a self-timed reset circuit configured to reset the output as a function of the entry address bit circuit.

* * * * *

UNITED STATES PATENT AND TRADEMARK OFFICE
CERTIFICATE OF CORRECTION

PATENT NO. : 5,809,528

DATED : September 15, 1998

INVENTOR(S) : Miller et al.

It is certified that error appears in the above-identified patent and that said Letters Patent is hereby corrected as shown below:

Claim 4, column 25, line 5, delete "LPU" and insert -- LRU --.

Signed and Sealed this

Ninth Day of March, 1999

Attest:

Q. TODD DICKINSON

Attesting Officer

Acting Commissioner of Patents and Trademarks